US012720607B2

(12) United States Patent
Dun

(10) Patent No.: US 12,720,607 B2
(45) Date of Patent: Aug. 25, 2026

(54) RANDOM ACCESS PROCESS CONTROL METHODS AND RELATED DEVICE

(71) Applicant: ZTE CORPORATION, Guangdong (CN)

(72) Inventor: Bosen Dun, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 279 days.

(21) Appl. No.: 18/682,335

(22) PCT Filed: Apr. 17, 2023

(86) PCT No.: PCT/CN2023/088729
§ 371 (c)(1),
(2) Date: Feb. 8, 2024

(87) PCT Pub. No.: WO2023/207657
PCT Pub. Date: Nov. 2, 2023

(65) Prior Publication Data

US 2024/0349352 A1 Oct. 17, 2024

(30) Foreign Application Priority Data

Apr. 29, 2022 (CN) ......................... 202210468455.0

(51) Int. Cl.
*H04W 74/0833* (2024.01)
*H04W 74/00* (2009.01)

(52) U.S. Cl.
CPC ..... *H04W 74/0833* (2013.01); *H04W 74/006* (2013.01)

(58) Field of Classification Search
None
See application file for complete search history.

(56) References Cited

U.S. PATENT DOCUMENTS 10,555,345 B2 * 2/2020 Vajapeyam ....... H04W 74/0833
2022/0408277 A1 12/2022 Yang et al.
(Continued)

FOREIGN PATENT DOCUMENTS

CN 111586879 A 8/2020
CN 113826436 A 12/2021
(Continued)

OTHER PUBLICATIONS

PCT International Search Report and Written Opinion (with English translations) for corresponding PCT Application No. PCT/CN2023/088729, mailed Jul. 27, 2023, 12 pages.
(Continued)

*Primary Examiner* — Hong S Cho
(74) *Attorney, Agent, or Firm* — Dority & Manning, P.A.

(57) ABSTRACT

Provided in the present application are random access process control methods and a related device, a method comprising: issuing to a terminal first configuration information, the first configuration information being used for instructing the terminal to repeatedly send a plurality of uplink signals after reception of a random access response message, the plurality of uplink signals comprising a first uplink signal and a second uplink signal; issuing to a signal adjustment apparatus second configuration information, the second configuration information being used for instructing the signal adjustment apparatus to relay the first uplink signal and the second uplink signal in different preset modes; and, upon reception of the plurality of uplink signals repeatedly sent by the terminal according to the random access response message, determining the type of the terminal according to an uplink signal reception condition. A method for controlling a random access procedure, a network device, a signal conditioning apparatus, a terminal, a computer-readable storage medium and a computer program product are pro-
(Continued)

vided. The method includes: issuing first configuration information to a terminal, the first configuration information being used to instruct the terminal to transmit a plurality of uplink signals repeatedly after the terminal receives a random access response message, and the plurality of uplink signals include a first and a second uplink signals; issuing second configuration information to a signal conditioning apparatus, the second configuration information being used to instruct the signal conditioning apparatus to relay the first and second uplink signals in different preset modes; and determining a type of the terminal according to a reception situation of the uplink signals in response to receiving the plurality of uplink signals transmitted by the terminal repeatedly according to the random access response message.

20 Claims, 7 Drawing Sheets

(56) References Cited

U.S. PATENT DOCUMENTS

2023/0217498 A1* 7/2023 Lee .................. H04W 74/0833 370/329
2023/0262751 A1 8/2023 Yu et al.

FOREIGN PATENT DOCUMENTS

| | | | |
|---|---|---|---|
| CN | 115955726 | A | 4/2023 |
| JP | 2011077563 | A | 4/2011 |
| JP | 2023537362 | A | 8/2023 |
| WO | WO2020197189 | A1 | 10/2020 |
| WO | WO2021076584 | A1 | 4/2021 |
| WO | WO2021138919 | A1 | 7/2021 |
| WO | WO2021230701 | A1 | 11/2021 |
| WO | WO2022027455 | A1 | 2/2022 |
| WO | WO2022036289 | A1 | 2/2022 |

OTHER PUBLICATIONS

3rd Generation Partnership Project, "On the structure of smart repeaters", 3GPP TSG RAN Meeting #94-e, Electronic Meeting, Dec. 6-17, 2021, 3 pages.

3rd Generation Partnership Project, "Views on smart repeaters", 3GPP TSG RAN Meeting #94-e, Electronic Meeting, Dec. 6-17, 2021, 3 pages.

3rd Generation Partnership Project, "Draft Report of 3GPP TSG RAN WG1 #109-e v0.3.0", 3GPP TSG RAN WG1 Meeting #110-e, Toulouse, France, Aug. 22-26, 2022, 242 pages.

Japanese Office Action (with English translation) for corresponding Application No. JP 2024-547716, dated Aug. 19, 2025, 9 pages.

Japanese Office Action (with English translation) for corresponding Application No. JP2024-547716, dated Jun. 3, 2025, 12 pages.

ETSI ISG RIS, Chair, Vice Chairs, "LSout to Key SDOs on the Formation of the ISG RIS", TSG SA Meeting #SP-94E, SP-211249, Electronic meeting, Dec. 14-20, 2021, 4 pages.

European Search Report for corresponding Application No. 23795090.2, dated Mar. 24, 2026, 9 pages.

Indian Office Action for corresponding Application No. 202417015037, dated May 11, 2026, 8 pages.

* cited by examiner

```
RACH-ConfigCommon ::=                SEQUENCE {
...,
msg3-repetition                   SEQUENCE {
        K2-offset-repetition
ENUMERATED {n1, n2, n3, n4, n5, n6, n7, n8, n9, n10},
        repetitionNumber-msg3
ENUMERATED {n2, n3, n4, n5, n6, n7, n8, n16},
}   OPTIONAL    -- Need R
...,
```

RANDOM ACCESS PROCESS CONTROL METHODS AND RELATED DEVICE

CROSS-REFERENCE TO RELATED APPLICATION(S)

This application is a national phase entry under 35 USC 371 of International Patent Application No. PCT/CN2023/088729 filed on Apr. 17, 2023, the International Patent Application is filed based on Chinese patent application with the application Ser. No. 202210468455.0, filed on Apr. 29, 2022, and claims the priority of the Chinese patent application, and the entire contents of the International Patent Application and the Chinese patent application are incorporated into this application for reference.

TECHNICAL FIELD

The present disclosure relates to communication technology, and in particular, to a method for controlling a random access procedure, a network device, a signal conditioning apparatus, a terminal, a computer-readable storage medium and a computer program product.

BACKGROUND

In the related art, cell coverage is increased by deploying a reconfigurable intelligent surface (RIS) or a Smart Repeater. During a random access procedure, if a network device can identify whether the access mode of a terminal is a direct access or a relay access through a RIS/Smart Repeater, a personalized strategy may be formulated and therefore, is beneficial to geographic location deployment of an RIS/Smart Repeater. Under the current protocol framework, a position of the terminal may be roughly estimated by distinguishing an accessed synchronization signal and PBCH block (SSB) beam, which has a low accuracy; and due to a relatively large beam coverage of frequency range 2 (FR2), there may be a terminal that is accessed directly and a terminal that is accessed by relaying through a RIS/Smart Repeater under a same receiving beam, and thus, it is difficult to accurately identify a type of a terminal during an access phase.

SUMMARY

Embodiments of the present disclosure provide a method for controlling a random access procedure, a network device, a signal conditioning apparatus, a terminal, a computer-readable storage medium and a computer program product, so as to identify a type of a terminal in an access phase.

In a first aspect, the embodiments of the present disclosure provide a method for controlling a random access procedure, which is applied to a network device. The method includes: issuing first configuration information to a terminal, where the first configuration information is used to instruct the terminal to transmit a plurality of uplink signals repeatedly after the terminal receives a random access response message, and the plurality of uplink signals include a first uplink signal and a second uplink signal; issuing second configuration information to a signal conditioning apparatus, where the second configuration information is used to instruct the signal conditioning apparatus to relay the first uplink signal and the second uplink signal in different preset modes; and determining a type of the terminal based on a reception situation of the uplink signals in response to receiving the plurality of uplink signals transmitted by the terminal repeatedly based on the random access response message.

In a second aspect, the embodiments of the present disclosure provide a method for controlling a random access procedure, which is applied to a signal conditioning apparatus. The method includes: acquiring second configuration information issued by a network device in response to receiving a plurality of uplink signals transmitted by a terminal repeatedly based on a random access response message; and relaying the plurality of uplink signals to the network device based on the second configuration information, where the plurality of uplink signals include a first uplink signal and a second uplink signal, and the first uplink signal and the third uplink signal are relayed in different preset modes, such that the network device determines a type of the terminal based on a reception situation of the uplink signals.

In a third aspect, the embodiments of the present disclosure provide a method for controlling a random access procedure, which is applied to a terminal. The method includes: acquiring first configuration information issued by a network device in response to receiving a random access response message from the network device; transmitting a plurality of uplink signals repeatedly, to the network device based on the first configuration information, such that the network device determines a type of the terminal based on a reception situation of the uplink signals; or, transmitting a plurality of uplink signals repeatedly, to the signal conditioning apparatus based on the first configuration information, where the plurality of uplink signals are relayed by the signal conditioning apparatus to the network device, such that the network device determines a type of the terminal based on a reception situation of the uplink signals, the plurality of uplink signals include a first uplink signal and a second uplink signal, and the first uplink signal and the second uplink signal are relayed by the signal conditioning apparatus in different preset modes.

In a fourth aspect, the embodiments of the present disclosure provide a network device. The network device includes: a processor and a memory, where the memory has program instructions stored thereon, and the program instructions, upon being executed by the processor, cause the processor to perform the method for controlling a random access procedure as described in the first aspect above.

In a fifth aspect, the embodiments of the present disclosure provide a signal conditioning apparatus. The signal conditioning apparatus includes: a processor and a memory; where the memory has program instructions stored thereon, and the program instructions, upon being executed by the processor, cause the processor to perform the method for controlling a random access procedure as described in the second aspect above.

In a sixth aspect, the embodiments of the present disclosure provide a terminal. The terminal includes: a processor and a memory, where the memory has program instructions stored thereon, and the program instructions, upon being executed by the processor, cause the processor to perform the method for controlling a random access procedure as described in the third aspect above.

In a seventh aspect, the embodiments of the present disclosure provide a computer-readable storage medium having program instructions stored thereon, where the program instructions, upon being executed on a computer, implement the method for controlling a random access procedure as described in any one of the first aspect, the second aspect or the third aspect above.

In an eighth aspect, the embodiments of the present disclosure provide a computer program product having program instructions stored thereon, where the program instructions, upon being executed on a computer, implement the method for controlling a random access procedure as described in any one of the first aspect, the second aspect or the third aspect.

In the embodiments of the present disclosure, a network device issues first configuration information to a terminal, where the first configuration information is used to instruct the terminal to transmit a plurality of uplink signals repeatedly after the terminal receives a random access response message, the plurality of uplink signals include a first uplink signal and a second uplink signal; the network device transmits second configuration information to the signal conditioning apparatus, where the second configuration information is used to instruct the signal conditioning apparatus to relay the first uplink signal and the second uplink signal in different preset modes; and the network device determines a type of the terminal based on a reception situation of the uplink signals in response to receiving the plurality of uplink signals transmitted by the terminal repeatedly. Since the plurality of uplink signals transmitted by the terminal accessed through the signal conditioning apparatus are relayed by the signal conditioning apparatus to the network device in different preset modes, these uplink signals relayed in different preset modes at the network device side are of a great difference from each other, such that the network device may judge whether these uplink signals from the terminal are transmitted directly by the terminal or relayed by the signal conditioning apparatus according to the difference between the received plurality of uplink signals, thereby realizing identification of the type of the terminal type during the access phase.

BRIEF DESCRIPTION OF THE DRAWINGS

The accompanying drawings are used to provide a further understanding of the technical solution of the present disclosure, constitute a part of the specification, are used to explain the technical solution of the present disclosure together with the embodiments of the present disclosure, and do not limit the technical solution of the present disclosure.

DETAILED DESCRIPTION

In order to make the purpose, technical solutions and advantages of the present disclosure more clear, the present disclosure will be further described in detail below with reference to the accompanying drawings and the embodiments. It should be understood that the specific embodiments described herein are only used to explain the present disclosure and are not used to limit the present disclosure.

It should be understood that in the description of the embodiments of the present disclosure, if there are descriptions of "first", "second", etc., the "first", "second", etc., are only used for the purpose of distinguishing technical features, and cannot be understood as indicating or implying relative importance or implicitly indicating a number of indicated technical features or implicitly indicating a precedence relationship of the indicated technical features. "At least one" refers to one or more, and "a plurality of" refers to two or more than two. "And/or" describes an associated relationship between associated objects, indicating that there may be three relationships, for example, A and/or B which represents the existence of A alone, the existence of A and B at the same time, and the existence of B alone, where A and B may be singular or plural. The character "/" generally indicates an "or" relationship between the associated objects. "At least one of the following" and similar expressions refer to any group of these items, including any group of singular or plural items. For example, at least one of a, b, and c may indicate: a; b; c; a and b; a and c; b and c; or, a and b and c, where a, b, c may be singular or plural.

In addition, the technical features involved in the respective embodiments of the present disclosure described below may be combined with each other as long as the technical features do not conflict with each other.

A major problem in high-frequency communication is sharp attenuation of signal energy as a transmission distance increases, thereby resulting in a small signal transmission distance and, further affecting signal coverage of a cell. In order to increase a range of the signal coverage of the cell, in the related art, the cell coverage may be increased by adding a reconfigurable intelligent surface (RIS) or a Smart Repeater between a network device and a terminal.

Figure 1:
FIG. 1 is a schematic diagram of a communication system applicable to the embodiments of the present disclosure.
Figure 1:
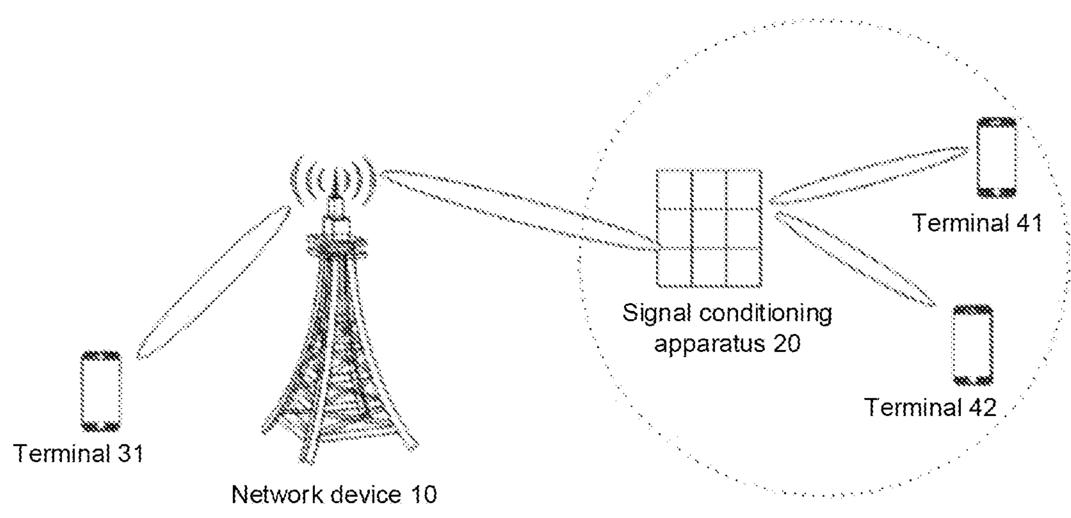

As shown in FIG. 1, FIG. 1 is a schematic diagram of a communication system applicable to the embodiments of the present disclosure. The communication system shown in FIG. 1 includes a network device 10, a signal conditioning apparatus 20 and a plurality of terminals (31, 41 and 42). The terminals may be grouped into two types: a first type and a second type. Terminals of the first type are located within the direct coverage range of the network device and directly access to the network device, such as the terminal 31 in FIG. 1. Terminals of the second type are located outside the direct coverage range of the network device, and access to the network device through the signal conditioning apparatus, such as the terminals 41 and 42 in FIG. 1. That is, information between the network device 10 and the terminals 41 and 42 needs to be relayed through the signal conditioning apparatus 20 to arrive at the network device 10 and the terminals 41 and 42, respectively. The signal conditioning apparatus 20 herein may be regarded as an RIS or a Smart Repeater.

It can be understood that the network device involved in the embodiments of the present disclosure may be a node in a radio access network, which may also be called a base station or may be called a radio access network (RAN) node (or device). For example, the network device may include an evolutional base station (NodeB or eNB or e-NodeB, evolutional Node B) in a long term evolution (LTE) system or in an evolved LTE (LTE-Advanced, LTE-A) system, such as a traditional macro base station eNB and a micro base station eNB in a heterogeneous network scenario. Alternatively, the network device may include a next generation node B (gNB) in a 5G new radio (NR) system. Alternatively, the network device may include a transmission reception point (TRP), a home base station (e.g., Home evolved NodeB, or Home Node B, HNB), a base band unit (BBU), a base band (BBU) pool, or a WiFi access point (AP), etc. Alternatively, the network device may include a centralized unit (CU) and a distributed unit (DU) in a cloud radio access network (CloudRAN) system. Alternatively, the network device may include a base station in a non-terrestrial network (NTN) which may be deployed on a high-altitude platform or a satellite. In the NTN, the network device may serve as a layer 1 (L1) relay, or as a base station, or as a DU, or as an integrated access and backhaul (IAB) node. Alternatively, the network device may be a device that implements base station functions in IoT, such as a device that implements base station functions in vehicle-to-everything (V2X), in device to device (D2D) or in machine to machine (M2M), which is not limited thereto in the embodiments of the present disclosure.

It should be understood that the terminal involved in the embodiments of the present disclosure may refer to a user device, an access terminal, a user unit, a user station, a mobile, a mobile station, a remote station, a remote terminal, a mobile device, a user terminal, a terminal, a wireless communication device, a user agent or a user apparatus. Alternatively, the terminal may be a cellular phone, a cordless phone, a session initiation protocol (SIP) phone, a wireless local loop (WLL) station, a personal digital assistant (PDA), a handheld device with wireless communication functions, a computing device or other processing devices connected to wireless modems, a vehicle-mounted device, a wearable device, a terminal device in 5G networks or a terminal device in future evolved communication networks, etc., which is not limited thereto in the embodiments of the present disclosure.

It can be understood that the reconfigurable intelligent surface (RIS) involved in the embodiments of the present disclosure is an artificial electromagnetic surface structure with programmable electromagnetic characteristics. A panel of the RIS includes a large number of electromagnetic units arranged in a matrix. The electromagnetic properties of the electromagnetic units may be dynamically regulated by a control circuit, thereby realizing intelligent reconstruction of wireless signal propagation characteristics in a three-dimensional space, which can break through the limitations of passive adaptation to traditional wireless environments.

It can be understood that the smart repeater involved in the embodiments of the present disclosure may be regarded as a signal relay apparatus deployed between a network node and a terminal device, so as to enhance link performance. In the downlink, the smart repeater receives information from the network node, enhances and amplifies the information, and then transmits the information to the terminal device. The same is true for the uplink.

It should be noted that, for convenience, in some descriptions of the embodiments of the present disclosure, "base station" may be used to refer to the network device, "RIS" or "Smart Repeater" may be used to refer to the signal conditioning apparatus, and "UE" or "user" may be used to refer to the terminal.

In order to facilitate understanding of the technical solution of the present disclosure, the random access procedure for establishing a connection between a terminal and a network device is briefly introduced below.

Random access procedure refers to a procedure from the user's attempt to access the network by transmitting a random access preamble to the establishment of a basic signaling connection between the network and the user. Random access is a key step in the mobile communication system, and is also the last step to establish a communication link between the terminal device and the network. The terminal device may perform information interaction with the network device through random access. Depending on whether the user exclusively occupies a preamble resource, random access modes of users may be grouped into a contention-based random access and a contention-free random access.

The contention-based random access procedure mainly includes the following four steps. In a first step, a terminal randomly selects a preamble from a preamble resource pool and transmits a random access request to the network device through a first message Msg1 including a random access preamble. In a second step, the network device transmits a random access response (RAR) to the terminal through a second message Msg2 including information, such as a random access preamble identifier, a temporary cell-radio network temporary identifier (C-RNTI), etc., and a time-frequency resource allocated for the next uplink transmission of the terminal. In a third step, the terminal transmits a radio resource control (RRC) connection request to the network device through a third message Msg3 including information, such as a user terminal identifier, an RRC link request, etc., the user terminal identifier being unique to the user and used to resolve conflicts. In a fourth step, the network device transmits a fourth message Msg4 to the terminal (i.e., this procedure is a contention resolution procedure), Msg4 including the user terminal identifier which won the conflict resolution. The user, after detecting its own identifier, upgrades the temporary C-RNTI to C-RNTI, transmits an ACK signal to the base station, completes the random access procedure, and waits for the scheduling of the base station. Otherwise, the user will start a new random access procedure after a delay.

The contention-free random access procedure mainly includes the following two steps. In a first step, the terminal transmits an allocated random access preamble to the network device through an A message MsgA (random access request). In a second step, the network device, after detecting the allocated random access preamble, transmits information, such as timing advance, uplink resource allocation, etc., to the terminal through a B message MsgB (Random Access Response, RAR). The user, after receiving the random access response, considers that the uplink synchronization has been completed and waits for further scheduling of the base station. Therefore, the contention-free random access procedure only includes two steps: the first step is to transmit the preamble sequence; and the second step is to transmit the random access response.

It should be understood that if the terminal accesses to the network device through the RIS/Smart Repeater, information interaction between the terminal and the network device during the above-mentioned random access procedure may only be implemented through the RIS/Smart Repeater relay.

During the random access procedure, if a network device may identify whether the access mode of a terminal is a direct access or a relay access through a RIS/Smart Repeater, a personalized strategy may be formulated and therefore, is beneficial to geographic position deployment of a RIS/Smart Repeater. Under the current protocol framework, the location of the terminal may be roughly estimated by distinguishing an accessed SSB beam, which has a low accuracy; and due to a relatively large beam coverage range of frequency range 2 (FR2), there may be a terminal that is accessed directly and a terminal that is accessed by relaying through a RIS/Smart Repeater under a same receiving beam, and thus, it is difficult to accurately identify a type of a terminal during an access phase.

In order to solve the above-mentioned technical problem, the embodiments of the present disclosure provide a method for controlling a random access procedure, a network device, a signal conditioning apparatus, a terminal, a computer-readable storage medium, and a computer program product, so as to realize identification of a type of a terminal during an access phase.

Figure 2:
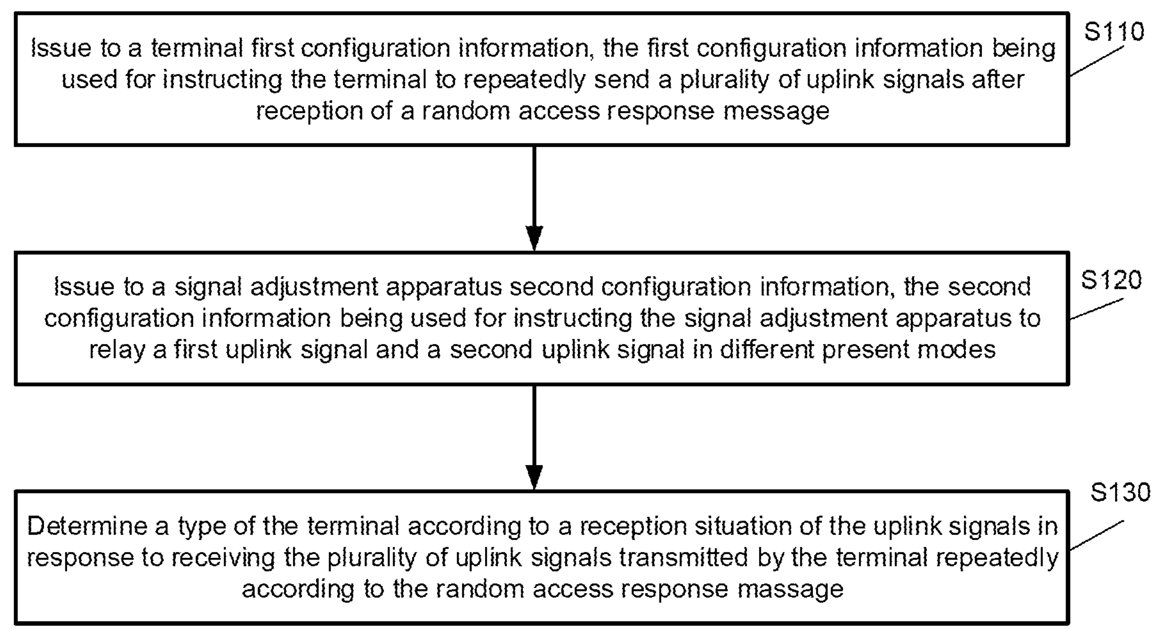
FIG. 2 is a flow chart of a method for controlling a random access procedure applied to a network device side provided in the embodiments of the present disclosure.

As shown in FIG. 2, FIG. 2 is a flow chart of a method for controlling a random access procedure provided in the embodiments of the present disclosure. The method is applied to the network device side and includes the following steps S110 to S130, and each of the steps S110 to S130 will be introduced in sequence below.

In step S110, first configuration information is issued to a terminal. The first configuration information is used to instruct the terminal to transmit a plurality of uplink signals repeatedly after the terminal receives a random access response message.

In the embodiments of the present disclosure, the network device issues the first configuration information to the terminal, such that after the terminal is enabled to initiate a random access request to the network device and receives a random access response from the network device, the terminal transmits a plurality of uplink signals repeatedly to the network device according to the first configuration information.

As an example, if the terminal initiates a contention-based random access request to the network device, the terminal transmits the plurality of uplink signals repeatedly to the network device, and the plurality of uplink signals may be a third message (Msg3) transmitted to the network device repeatedly in a plurality of random access procedure.

As another example, the terminal transmitting a plurality of uplink signals repeatedly to the network device may refer to the terminal transmitting a plurality of physical uplink shared channels (PUSCH) repeatedly to the network device. The terminal, after receiving an uplink resource allocated by the network device, may transmit PUSCH repeatedly to the network device according to the allocated uplink resource.

It should be understood that the uplink signals transmitted by the terminal repeatedly may also be other types of signals, which is not limited thereto in the embodiments of the present disclosure.

The first configuration information in the embodiment of the present disclosure includes at least one of the following information: a time domain starting position of repeated transmissions, a time domain interval of repeated transmissions, and a number of repeated transmission signals. The time domain starting position of repeated transmissions indicates a time domain position of a first uplink signal in the plurality of uplink signals, and specifically may be an offset interval with a unit of a time slot or a symbol, that is, the uplink signals start to be transmitted repeatedly after the offset interval elapses from the reception time of the random access response message. The time domain interval of repeated transmissions indicates a transmission time domain interval of the uplink signals that are repeatedly transmitted, i.e., a time domain interval between signals repeatedly transmitted twice and with a unit of a time slot, a symbol, etc. A number of repeated transmission signals indicates a number of repeated transmissions of the uplink signals that are repeatedly transmitted, for example, the transmission is repeated by 4 times, that is, a number of the signals that are repeatedly transmitted is 4. Of course, the first configuration information may include more or less information than the above. For example, the first configuration information may not indicate the time domain starting position of repeated transmissions, and the terminal uses a default offset interval to determine the time domain starting position of repeated transmissions. The first configuration information may not indicate a time domain interval of repeated transmissions, and the terminal uses a default time domain interval for repeated transmissions. The first configuration information may not indicate a number of repeated transmission signals, and the terminal uses a default number of repeated transmission signals for repeated transmission.

Exemplarily, the network device may issue the first configuration information to the terminal in the following two modes.

The first mode is that the network device issues the first configuration information to the terminal through random access channel (RACH) configuration information, and the RACH configuration information includes an information element carrying the first configuration information. The RACH configuration information may be RACH-Config Common information, RACH-Config Dedicated signaling, or RACH-Config Generic signaling.

Figures 3, 4:
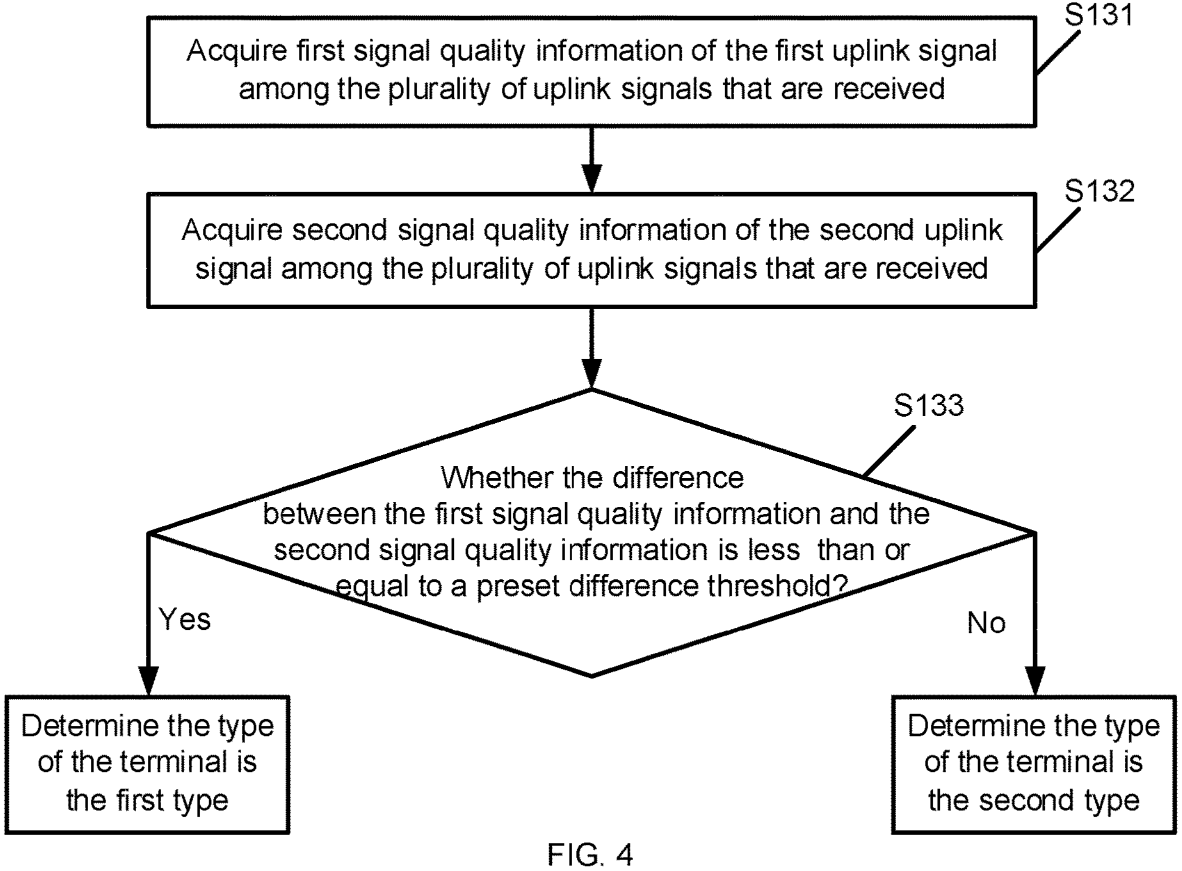
FIG. 3 is a schematic diagram of a format of RACH-Config Common information provided in the embodiments of the present disclosure.
FIG. 4 is a flow chart for determining a type of a terminal in the embodiments of the present disclosure.

It should be understood that the RACH-Config Common information as the RACH configuration information is taken as an example. In order to carry the first configuration information in the RACH-Config Common information, a field related to the first configuration information may be added to the information element (IE) of the RACH-Config Common information. As shown in FIG. 3, FIG. 3 is a schematic diagram of a format of the RACH-Config Common information, where a field related to the first configuration information includes K2-offset-repetition and repetition-Number-Msg3. Herein, K2-offset-repetition refers to a time domain interval of repeated transmissions, and repetition-Number-Msg3 refers to a number of repeated transmission signals.

The second mode is that the network device issues the first configuration information to the terminal through the random access response message, where the first configuration information is carried in the random access response message.

It should be understood that the network device may issue the first configuration information to the terminal through the RAR message in the random access procedure, that is, the first configuration information is carried in the RAR message in the random access procedure. The RAR message herein may specifically be a second message in the random access procedure (including the contention-based random access mode or the contention-free random access mode). Specifically, a field related to the first configuration information may be added to the RAR message, for example, K2+j (referring to a time domain starting position of repeated transmissions), K2-offset-repetition (referring to a time domain interval of repeated transmissions), and repetition-Number-Msg3 (referring to a number of repeated transmission signals).

In step S120, second configuration information is issued to the signal conditioning apparatus. The second configuration information is used to instruct the signal conditioning apparatus to relay a first uplink signal and a second uplink signal in different preset modes.

In the embodiments of the present disclosure, the terminal initiates a random access request to the network device, and the network device transmits a random access response to the terminal. The terminal, after receiving the random access response, transmits a plurality of uplink signals repeatedly to the network device according to a preset first configuration information.

The plurality of uplink signals transmitted by the terminal repeatedly include the first uplink signal and the second uplink signal. Specifically, the first uplink signal are different signals among the plurality of uplink signals transmitted by the terminal repeatedly. The first uplink signal may include one or more signals, and the second uplink signal may also include one or more signals.

In an example, the first uplink signal characterizes an i-th uplink signal among the plurality of uplink signals transmitted by the terminal repeatedly, where i is an odd number; and the second uplink signal represents a j-th uplink signal among the plurality of uplink signals transmitted by the terminal repeatedly, where j is an even number. For example, the terminal, after receiving the random access response from the network device side, transmits 4 uplink signals repeatedly, where the first signal and the third signal belong to the first uplink signal, and the second signal and the fourth signal belong to the second uplink signal.

The first uplink signal and the second uplink signal may also characterize one or more specific signals among the plurality of uplink signals transmitted by the terminal repeatedly. For example, the terminal, after receiving the random access response from the network device side, transmits 4 uplink signals repeatedly, and the first uplink signal specifically refers to the first signal and the second signal, and the second uplink signal specifically refers to the third signal and the fourth signal.

In the embodiments of the present disclosure, the network device issues the second configuration information to the signal conditioning apparatus, such that the signal conditioning apparatus, after receiving the plurality of uplink signals transmitted from the terminal repeatedly, relays the first uplink signal and the second uplink signal among these uplink signals in different modes. Generally speaking, the signals relayed in different modes will have a great difference on the network device side; however, since the plurality of uplink signals directly and repeatedly transmitted by the terminal to the network device have not been specially processed, there will be no great difference between the plurality of uplink signals on the network device side. In this way, the network device may determine whether the uplink signals are relayed by the signal conditioning apparatus or directly transmitted by the terminal according to whether there is a great difference between the received uplink signals that are repeatedly transmitted.

Exemplarily, the second configuration information includes at least one of the following information: a time domain starting position of repeated transmissions, a time domain interval of repeated transmissions, a number of repeated transmissions, changed codebook information, changed phase information, and stop-relay indication information.

Herein, the time domain starting position of repeated transmissions indicates a time domain position of the first uplink signal among the plurality of uplink signals transmitted by the terminal repeatedly, where the signal conditioning apparatus may determine a starting position of the uplink signal reception according to the time domain starting position.

The time domain interval of repeated transmissions indicates a time domain interval of the plurality of uplink signals that are repeatedly transmitted, where the signal conditioning apparatus may receive the uplink signal transmitted by the terminal repeatedly according to the time domain interval.

A number of repeatedly transmission signals indicates a number of uplink signals transmitted by the terminal repeatedly, where the signal conditioning apparatus may receive a corresponding number of uplink signals according to the number of repeatedly transmission signals.

The changed codebook information enables the signal conditioning apparatus to change a first codebook, and may be specifically a codebook index, such that the signal conditioning apparatus acquires a second codebook according to the codebook index. It can be understood that the second codebook is a codebook different from the first codebook. The first codebook refers to a codebook originally used for the signal conditioning apparatus to relay the current terminal signal.

The changed phase information is used for the signal conditioning apparatus to change the phase of the first codebook to obtain a third codebook.

The stop-relay indication information is used for the signal conditioning apparatus to relay a part of the uplink signals repeatedly transmitted by the terminal with a stop-relay strategy.

It should be understood that the second configuration information may include one or more of a time domain starting position of repeated transmissions, a time domain interval of repeated transmissions, a number of repeated transmission signals, changed codebook information, changed phase information, and stop-relay indication information, and specific content of the second configuration information is not limited in the embodiment of the present disclosure.

Exemplarily, the signal conditioning apparatus relays the first uplink signal and the second uplink signal in different preset modes including the following three implementing mode.

The first mode is that the signal conditioning apparatus relays the first uplink signal with a first codebook, and relays the second uplink signal with a second codebook.

It can be understood that if the second configuration information includes the changed codebook information, the signal conditioning apparatus may acquire the second codebook according to the changed codebook information. The signal conditioning apparatus adopts the first codebook to relay the first uplink signal among the uplink signals transmitted by the terminal repeatedly, and adopts the second codebook to relay the second uplink signal among the uplink signals transmitted by the terminal repeatedly. In this way, the relay mode for the first uplink signal is different from that for the second uplink signal.

The second mode is that the first uplink signal is relayed with the first codebook, and the second uplink signal is relayed with a third codebook obtained by changing the phase of the first codebook.

It can be understood that if the second configuration information includes the changed phase information, the signal conditioning apparatus may change the phase of the first codebook based on the changed phase information, so as to obtain the third codebook. The signal conditioning apparatus adopts the first codebook to relay the first uplink signal among the uplink signals transmitted by the terminal repeatedly, and adopts the third codebook to relay the second uplink signal among the uplink signals transmitted by the terminal repeatedly. In this way, the relay mode for the first uplink signal is different from that for the second uplink signal.

The third mode is that the first uplink signal is relayed with the first codebook, and the second uplink signal is relayed with the stop-relay strategy.

It can be understood that if the second configuration information includes the stop-relay indication information, the signal conditioning apparatus may adopt the first codebook to relay the first uplink signal among the uplink signals transmitted by the terminal repeatedly, and may adopt the stop-relay strategy to relay the second uplink signal among the uplink signals transmitted by the terminal repeatedly. Specifically, a panel may be turned off to achieve the purpose of stopping relaying when the second uplink signal is relayed.

Exemplarily, the second configuration information is issued to the signal conditioning apparatus in any of the following two modes.

The first mode is that the second configuration information is issued to the signal conditioning apparatus when the connection between the network device and the signal conditioning apparatus is established.

It can be understood that, when the RIS or Smart Repeater is added, the network device may issue the second configuration information as a part of the existing communication content in a semi-static mode. When the terminal needs to be issued the random access response, an activating signaling of the second configuration information is notified to the RIS/Smart Repeater through a new reference signal, a data packet, and the like.

The second mode is that when the random access response message is issued, the second configuration information is issued to the signal conditioning apparatus.

It can be understood that when the terminal needs to be issued the random access response, the network device may dynamically transmit the second configuration information to the RIS/Smart Repeater through a new reference signal, a data packet, etc., and directly activate the second configuration information.

In step S130, the type of the terminal is determined according to a reception situation of the uplink signals in response to receiving the plurality of uplink signals transmitted by the terminal repeatedly according to the random access response message.

The type of terminal described in the embodiments of the present disclosure includes a first type and a second type. The first type characterizes that the terminal accesses to the network device directly, and the second type characterizes that the terminal accesses to the network device through the signal conditioning apparatus.

In the embodiments of the present disclosure, the type of the terminal being determined according to a reception situation of the uplink signals may specifically refer to the type of the terminal being determined according to the signal quality information of the plurality of uplink signals that are received.

Exemplarily, the signal quality information may include information, such as reference signal receiving power (RSRP), signal to interference plus noise ratio (SINR), channel quality indicator (CQI), reference signal received quality (RSRQ), and the like.

Exemplarily, as shown in FIG. 4, the type of the terminal being determined according to the signal quality information of the plurality of uplink signals specifically that are received includes but is not limited to the following steps S131 to S133.

In step S131, first signal quality information of the first uplink signal among the plurality of uplink signals that are received is acquired.

In step S132, second signal quality information of the second uplink signal among the plurality of uplink signals that are received is acquired.

In step S133, whether a difference between the first signal quality information and the second signal quality information is less than or equal to a preset difference threshold is judged. If the difference between the first signal quality information and the second signal quality information is less than or equal to the preset difference threshold, the type of the terminal is determined to be the first type; and if the difference between the first signal quality information and the second signal quality information is not less than or equal to the preset difference threshold, the type of the terminal is determined to be the second type.

In the embodiments of the present disclosure, whether the plurality of repeated uplink signals that are currently received is transmitted by the first type of terminal or the second type of terminal is judged by comparing the signal quality information of the first uplink signal and the signal quality information of the second uplink signal. It can be understood that, if the plurality of repeated uplink signals are transmitted by the first type of terminal, there is no great deference between signal qualities of the first uplink signal and the second uplink signal which are received on the network device side; and if the plurality of repeated uplink signals are transmitted by the second type of terminal, there is a great deference between signal qualities of the first uplink signal and the second uplink signal which are received on the network device side for the reason that a signal from the second type of terminal needs to pass through the signal conditioning apparatus, and further, the signal conditioning apparatus adopts different modes to relay the first uplink signal and the second uplink signal.

For example, when the RIS panel is turned off, RSRP and SINR of the second uplink signal transmitted by the second type of terminal and received by the network device are very small, and have a great difference from RSRP and SINR of the received second uplink signal transmitted by the second type terminal under the condition that the RIS panel is turned on. Based on this, in the embodiments of the present disclosure, a reasonable difference threshold is set, whether the difference between the first signal quality information corresponding to the first uplink signal and the second signal quality information corresponding to the second uplink signal is greater than the difference threshold is judged, and then, whether the terminal is the first type of terminal or the second type of terminal is determined.

It can be understood that in order to enhance the accuracy of the identification of the type of terminal, a variety of signal quality information may be combined as a judgment factor. Exemplarily, the first signal quality information includes a first RSRP and a first SINR, the second signal quality information includes a second RSRP and a second SINR, and the difference threshold includes an RSRP difference threshold and an SINR difference threshold. In response to the difference between the first signal quality information and the second quality information being greater than the preset difference threshold, the determination of the type of the terminal to be the second type includes: in response to the difference between the first RSRP and the second RSRP being greater than the preset RSRP difference threshold and the difference between the first SINR and the second SINR being greater than the preset SINR difference threshold, the type of the terminal is determined to be the second type.

It can be understood that when there are a plurality of first uplink signals and a plurality of second uplink signals, the plurality pieces of signal quality information corresponding to the first uplink signals may be averaged to obtain the first signal quality information; and the plurality pieces of signal quality information corresponding to the second uplink signals may be averaged to obtain the second signal quality information.

Exemplarily, when there are a plurality of first uplink signals and a plurality of second uplink signals, the first RSRP is an average of RSRPs corresponding to the plurality of first uplink signals, and the first SINR is an average of SINRs corresponding to the plurality of first uplink signals, the second RSRP is an average of RSRPs corresponding to the plurality of second uplink signals, and the second SINR is an average of the SINRs corresponding to the plurality of second uplink signals.

Figure 5:
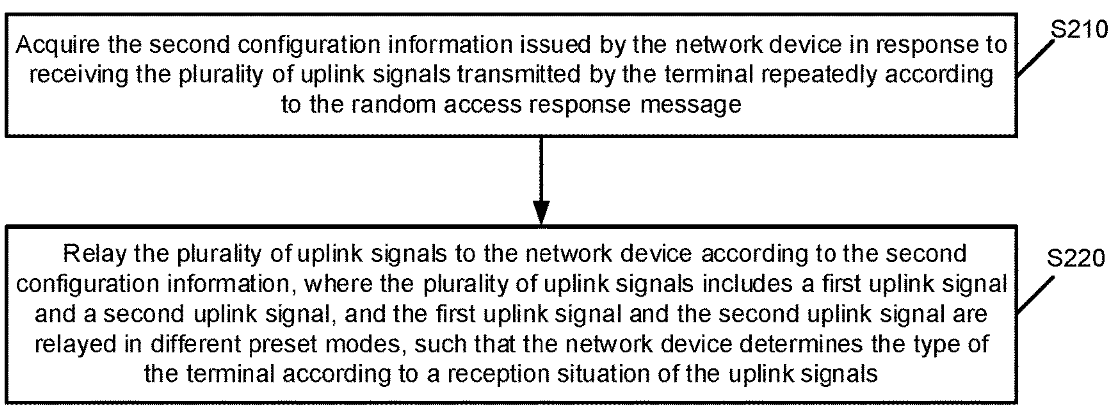
FIG. 5 is a flow chart of a method for controlling a random access procedure applied to a signal conditioning apparatus side provided in the embodiments of the present disclosure.

As shown in FIG. 5, FIG. 5 is a flow chart of a method for controlling a random access procedure provided in the embodiments of the present disclosure. The method is applied to the signal conditioning apparatus side and includes the following steps S210 to S220. Each of the following steps S210 to S220 is introduced in sequence below.

In step S210, in response to receiving the plurality of uplink signals transmitted by the terminal repeatedly according to the random access response message, the second configuration information issued by the network device is acquired.

In step S220, the plurality of uplink signals are relayed to the network device according to the second configuration information. The plurality of uplink signals include the first uplink signal and the second uplink signal, and the first uplink signal and the second uplink signal are relayed in different preset modes, such that the network device determines the type of the terminal according to a reception situation of the uplink signals.

In the embodiments of the present disclosure, after the signal conditioning apparatus receives the second configuration information issued by the network device, if the plurality of uplink signals that are transmitted repeatedly are received from the terminal, the first uplink signal and the second uplink signal among these uplink signals are relayed in different modes according to the second configuration information.

Specifically, the terminal initiates a random access request to the network device, and the network device transmits a random access response to the terminal. The terminal, after receiving the random access response, transmits the plurality of uplink signals repeatedly to the network device according to a preset first configuration information. The uplink signals include PUSCH or a third message transmitted by the terminal during the random access procedure.

It can be understood that the first uplink signal and the second uplink signal are different signals among the plurality of uplink signals transmitted by the terminal repeatedly. The first uplink signal and the second uplink signal may include one or more signals, respectively.

In an example, the first uplink signal characterizes an i-th uplink signal among the plurality of uplink signals transmitted by the terminal repeatedly, where i is an odd number; and the second uplink signal represents a j-th uplink signal among the plurality of uplink signals transmitted by the terminal repeatedly, where j is an even number. For example, the terminal, after receiving the random access response from the network device side, transmits 4 uplink signals repeatedly, where the first signal and the third signal belong to the first uplink signal, and the second signal and the fourth signal belong to the second uplink signal.

The first uplink signal and the second uplink signal may also characterize one or more specific signals among the plurality of uplink signals transmitted by the terminal repeatedly. For example, the terminal, after receiving the random access response from the network device side, transmits 4 uplink signals repeatedly, and the first uplink signal specifically refers to the first signal and the second signal, and the second uplink signal specifically refers to the third signal and the fourth signal.

Exemplarily, the second configuration information includes at least one piece of the following information: a time domain starting position of repeated transmissions, a time domain interval of repeated transmissions, a number of repeated transmission signals, changed codebook information, changed phase information, and stop-relay indication information.

The time domain starting position of repeated transmissions indicates a time domain position of the first uplink signal among the plurality of uplink signals transmitted by the terminal repeatedly, and the signal conditioning apparatus may determine the starting position of the uplink signal reception according to the time domain starting position.

The time domain interval of repeated transmissions indicates a time domain interval of the plurality of uplink signals transmitted repeatedly, and the signal conditioning apparatus may receive the uplink signals transmitted by the terminal repeatedly according to the time domain interval.

A number of repeated transmission signals indicates a number of uplink signals transmitted by the terminal repeatedly, and the signal conditioning apparatus may receive a corresponding number of uplink signals based on the number of repeated transmission signals.

The changed codebook information enables the signal conditioning apparatus to change a first codebook, and may specifically be a codebook index, such that the signal conditioning apparatus acquires the second codebook according to the codebook index. It can be understood that the second codebook is a codebook different from the first codebook. The first codebook refers to a codebook originally used by the signal conditioning apparatus to relay the current terminal signal.

The changed phase information is used to enable the signal conditioning apparatus to change the phase of the first codebook, so as to obtain the third codebook.

The stop-relay indication information is used to enable the signal conditioning apparatus to relay a part of the uplink signals transmitted by the terminal repeatedly with the stop-relay strategy.

It should be understood that the second configuration information may include one or more of a time domain starting position of repeated transmissions, a time domain interval of repeated transmissions, a number of repeated transmission signals, changed codebook information, changed phase information, and stop-relay indication information; and the specific content of the second configuration information is not limited in the embodiments of the present disclosure.

Exemplarily, the signal conditioning apparatus relays the first uplink signal and the second uplink signal in different preset modes including the following three modes.

The first mode is that the signal conditioning apparatus relays the first uplink signal with the first codebook, and relays the second uplink signal with the second codebook.

It can be understood that if the second configuration information includes the changed codebook information, the signal conditioning apparatus may acquire the second codebook according to the changed codebook information. The signal conditioning apparatus adopts the first codebook to relay the first uplink signal among the uplink signals transmitted by the terminal repeatedly, and adopts the second codebook to relay the second uplink signal among the uplink signals transmitted by the terminal repeatedly. In this way, the relay mode for the first uplink signal is different from that for the second uplink signal. Herein, the first codebook is a codebook different from the second codebook.

The second mode is that the first uplink signal is relayed with the first codebook, and the second uplink signal is relayed with a third codebook obtained by changing the phase of the first codebook.

It can be understood that if the second configuration information includes the changed phase information, the signal conditioning apparatus may change the phase of the first codebook based on the changed phase information, so as to obtain the third codebook. The signal conditioning apparatus adopts the first codebook to relay the first uplink signal among the uplink signals repeatedly transmitted by the terminal, and adopts the third codebook to relay the second uplink signal among the uplink signals transmitted by the terminal repeatedly. In this way, the relay mode for the first uplink signal is different from that for the second uplink signal.

The third mode is that the first uplink signal is relayed with the first codebook, and the second uplink signal is relayed with the stop-relay strategy.

It can be understood that if the signal conditioning apparatus is an RIS and the second configuration information includes the stop-relay indication information, the RIS may adopt the first codebook to relay the first uplink signal among the uplink signals transmitted by the terminal repeatedly, and adopt the stop-relay strategy to relay the second uplink signal among the uplink signals transmitted by the terminal repeatedly. Specifically, a panel may be turned off to achieve the purpose of stopping relaying when the second uplink signal is relayed.

Exemplarily, the signal conditioning apparatus may acquire the second configuration information issued by the network device in any of the following two modes.

The first mode is that the second configuration information is received from the network device when the connection between the signal conditioning apparatus and the network device is established.

It can be understood that, when the RIS or Smart Repeater is added, the network device may issue the second configuration information as a part of the existing communication content in a semi-static mode. When the terminal needs to be issued the random access response, an activating signaling of the second configuration information is notified to the RIS/Smart Repeater through a new reference signal, a data packet, and the like, such that the RIS/Smart Repeater detects the uplink signals transmitted by the terminal repeatedly.

The second mode is that when the random access response message is received from the network device, the second configuration information is received from the network device.

It can be understood that when the terminal needs to be issued the random access response, the network device may dynamically issue the second configuration information to the RIS/Smart Repeater through a new reference signal, a data packet, etc., and directly activate the second configuration information.

It can be understood that the signal conditioning apparatus receives the random access response message from the network device and forwards the random access response message to the terminal.

The above-mentioned random access response message may further carry the first configuration information, and the first configuration information is used to instruct the terminal to transmit the plurality of uplink signals repeatedly after the terminal receives the random access response message. The first configuration information includes at least one piece of the following information: a time domain starting position of repeated transmissions, a time domain interval of repeated transmissions, and a number of repeated transmission signals. The time domain starting position of repeated transmissions indicates a time domain position of the first uplink signal among the plurality of uplink signals, and specifically may be an offset interval with a unit of a time slot or a symbol, that is, the uplink signals start to be transmitted repeatedly after the offset interval elapses from the reception time of the random access response message. The time domain interval of repeatedly transmissions indicates a transmission time domain interval of the uplink signals that are repeatedly transmitted, i.e., a time domain interval between signals repeatedly transmitted twice and with a unit of a time slot, a symbol, etc. A number of repeated transmission signals indicates a number of repeated transmissions of the uplink signals that are repeatedly transmitted, for example, the transmission is repeated by 4 times, that is, a number of the signals that are repeatedly transmitted is 4.

It can be understood that signals relayed in different modes will have a great difference on the network device side; however, since the plurality of uplink signals directly and repeatedly transmitted by the terminal to the network device have not been specially processed, there will be no great difference between the plurality of uplink signals on the network device side. In this way, the network device may determine whether the uplink signals are relayed by the signal conditioning apparatus or directly transmitted by the terminal according to whether there is a great difference between received uplink signals that are repeatedly transmitted. For example, the type of the terminal is determined according to the received signal quality information of the plurality of uplink signals.

Figure 6:
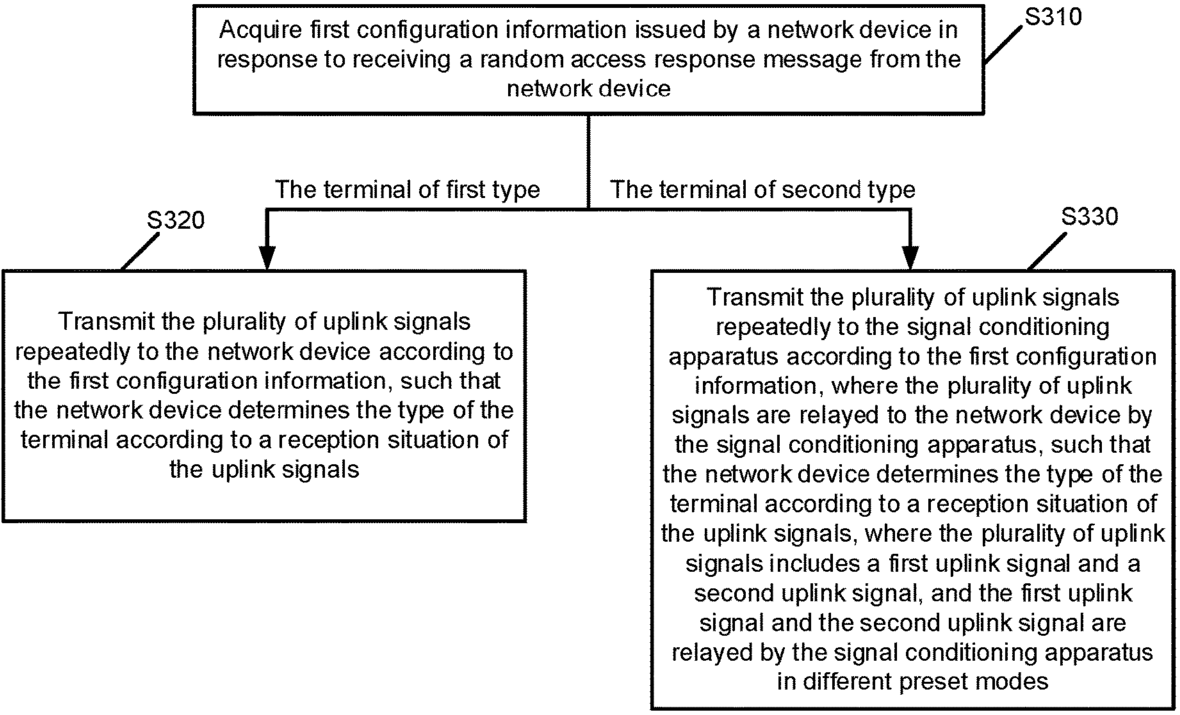
FIG. 6 is a flow chart of a method for controlling a random access procedure applied to a terminal side provided in the embodiments of the present disclosure.

As shown in FIG. 6, FIG. 6 is a method for controlling a random access procedure provided in the embodiments of the present disclosure. The method is applied to a terminal and includes the following steps S310 to S330.

In step S310, the first configuration information issued by the network device is acquired in response to receiving the random access response message from the network device.

In the embodiments of the present disclosure, the terminal initiates a random access request to the network device, and the network device transmits a random access response to the terminal. The terminal, after receiving the random access response, transmits a plurality of uplink signals repeatedly to the network device according to the preset first configuration information.

The uplink signals include a physical uplink shared channel (PUSCH) or the third message in the random access procedure.

As an example, if the terminal initiates a contention-based random access request to the network device, the terminal transmits a plurality of uplink signals repeatedly to the network device, and the plurality of uplink signals may be a plurality of third messages (Msg3) in the random access procedure to the network device.

As another example, the terminal transmitting a plurality of uplink signals repeatedly to the network device may refer to the terminal transmitting a plurality of PUSCHs repeatedly to the network device. The terminal, after receiving the uplink resources allocated by the network device, may transmit PUSCH repeatedly to the network device according to the allocated uplink resources.

It should be understood that the uplink signals transmitted by the terminal repeatedly may be other types of signals, which are not limited in the embodiments of the present disclosure.

The first configuration information in the embodiments of the present disclosure includes at least one piece of the following information: a time domain starting position of repeated transmissions, a time domain interval of repeated transmissions, and a number of repeated transmission signals. The time domain starting position of repeated transmissions indicates a time domain position of the first uplink signal among the plurality of uplink signals that are repeatedly transmitted, and may specifically be an offset interval with a unit of a time slot or a symbol, that is, the uplink signals start to be transmitted repeatedly after the above-mentioned offset interval elapses from the reception time of the random access response message. The time domain interval of repeated transmissions indicates a transmission time domain interval of the uplink signal that are repeatedly transmitted, i.e., a time domain interval between signals repeatedly transmitted twice and with a unit of a time slot, symbol, etc. A number of repeated transmission signals indicates a number of repeated transmissions of the uplink signals that are repeatedly transmitted, for example, the transmission is repeated by 4 times, that is, a number of signals that are repeatedly transmitted is 4. Of course, the first configuration information may include more or less information than the above. For example, the first configuration information may not indicate a starting position of the time domain for repeated transmissions, and the terminal uses a default offset interval to determine a time domain starting position for repeated transmissions; the first configuration information may not indicate a time domain interval for repeated transmissions, and the terminal uses a default time domain interval for repeated transmissions; and the first configuration information may not indicate a number of repeated transmission signals, and the terminal uses a default number of repeated transmission signals for repeated transmission.

It can be understood that the terminal may acquire the first configuration information in any of the following two modes.

The first mode is that the first configuration information is acquired from the random access channel (RACH) configuration information transmitted by the network device, and the random access channel (RACH) configuration information includes an information element carrying the first configuration information.

The RACH configuration information may be RACH-Config Common information or other levels of signaling, which is not limited in the embodiments of the present disclosure.

The RACH-Config Common information as the RACH configuration information is taken as an example. In order to carry the first configuration information in the RACH-Config Common information, a field related to the first configuration information may be added to the information element (IE) of the RACH-Config Common information. As shown in FIG. 3, FIG. 3 is a schematic diagram of a format of the RACH-Config Common information, where a field related to the first configuration information includes K2-offset-repetition and repetition-Number-Msg3. Herein, K2-offset-repetition refers to a time domain interval of repeated transmissions; and repetition-Number-Msg3 refers to a number of repeated transmission signals.

The second mode is that the first configuration information is acquired from the random access response message, where the first configuration information is carried in the random access response message.

It can be understood that the terminal may acquire the first configuration information issued by the network device through the RAR message in the random access procedure, that is, the first configuration information is carried in the RAR message in the random access procedure. The RAR message herein may specifically be the second message in the random access procedure (including the contention-based random access mode or the contention-free random access mode). Specifically, a field related to the first configuration information may be added to the RAR message, for example, K2+j (referring to a time domain starting position of repeated transmissions), K2-offset-repetition (referring to a time domain interval of repeated transmissions), and repetition-Number-Msg3 (referring to a number of repeated transmission signals).

The types of terminals described in the embodiments of the present disclosure include a first type and a second type. The first type characterizes that the terminal accesses to the network device directly, and the second type characterizes that the terminal accesses to the network device through a signal conditioning apparatus. If the terminal is a first type of terminal, the following step S320 is performed; and if the terminal is a second type of terminal, the following step S330 is performed.

In step S320, the plurality of uplink signals are transmitted to the network device repeatedly according to the first configuration information, such that the network device determines the type of the terminal according to a reception situation of the uplink signals.

The first type of terminal directly transmits the uplink signals to the network device, without special processing on any of the uplink signals during the transmission process.

In step S330, the plurality of uplink signals are transmitted to the signal conditioning apparatus repeatedly according to the first configuration information, and the plurality of uplink signals are relayed to the network device through the signal conditioning apparatus, such that the network device determines the type of the terminal according to a reception situation of the uplink signals. The plurality of uplink signals includes a first uplink signal and a second uplink signal, and the first uplink signal and the second uplink signal are relayed by the signal conditioning apparatus in different preset modes.

In the embodiments of the present disclosure, the plurality of uplink signals transmitted by the terminal repeatedly include a first uplink signal and a second uplink signal. Specifically, the first uplink signal and the second uplink signal are different signals among the plurality of uplink signals transmitted by the terminal repeatedly. The first uplink signal may include one or more signals, and the second uplink signal may include one or more signals.

In an example, the first uplink signal characterizes an i-th uplink signal among the plurality of uplink signals transmitted by the terminal repeatedly, where i is an odd number; and the second uplink signal represents a j-th uplink signal among the plurality of uplink signals transmitted by the terminal repeatedly, where j is an even number. For example, the terminal, after receiving the random access response from the network device side, transmits 4 uplink signals repeatedly, where the first signal and the third signal belong to the first uplink signal, and the second signal and the fourth signal belong to the second uplink signal.

The first uplink signal and the second uplink signal may also characterize one or more specific signals among the plurality of uplink signals transmitted by the terminal repeatedly. For example, the terminal, after receiving the random access response from the network device side, transmits 4 uplink signals repeatedly, and the first uplink signal specifically refers to the first signal and the second signal, and the second uplink signal specifically refers to the third signal and the fourth signal.

It can be understood that the second type of terminal transmits the uplink signals repeatedly to the signal conditioning apparatus. The first uplink signal and the second uplink signal among the uplink signals are relayed by the signal conditioning apparatus with different preset modes, specifically including the following three modes.

The first mode is that the signal conditioning apparatus relays the first uplink signal with a first codebook, and relays the second uplink signal with a second codebook.

It can be understood that if the second configuration information includes the changed codebook information, the signal conditioning apparatus may acquire the second codebook according to the changed codebook information. The signal conditioning apparatus adopts the first codebook to relay the first uplink signal among the uplink signals transmitted by the terminal repeatedly, and adopts the second codebook to relay the second uplink signal among the uplink signals transmitted by the terminal repeatedly. In this way, the relay mode for the first uplink signal is different from that for the second uplink signal.

The second mode is that the first uplink signal is relayed with the first codebook, and the second uplink signal is relayed with the third codebook obtained by changing the phase of the first codebook.

It can be understood that if the second configuration information includes the changed phase information, the signal conditioning apparatus may change the phase of the first codebook based on the changed phase information, so as to obtain the third codebook. The signal conditioning apparatus adopts the first codebook to relay the first uplink signal among the uplink signals transmitted by the terminal repeatedly, and adopts the third codebook to relay the second uplink signal among the uplink signals transmitted by the terminal repeatedly. In this way, the relay mode for the first uplink signal is different from that for the second uplink signal.

The third mode is that the first uplink signal is relayed with the first codebook, and the second uplink signal is relayed with the stop-relay strategy.

It can be understood that if the signal conditioning apparatus is an RIS and the second configuration information includes the stop-relay indication information, the RIS may adopt the first codebook to relay the first uplink signal among the uplink signals transmitted by the terminal repeatedly and adopt the stop-relay strategy to relay the second uplink signal. Specifically, a panel may be turned off to achieve the purpose of stopping relaying when the second uplink signal is relayed.

It can be understood that signals relayed in different modes will have a great difference on the network device side; and since the plurality of uplink signals directly and repeatedly transmitted by the terminal to the network device have not been specially processed, there will no great difference between the plurality of uplink signals on the network device side. In this way, the network device may determine whether the uplink signals are relayed by the signal conditioning apparatus or directly transmitted by the terminal according to whether there is a great difference between received uplink signals that are repeatedly transmitted. For example, the type of the terminal is determined according to the received signal quality information of the plurality of uplink signals.

In order to understand the solutions of the embodiments of the present disclosure better, several specific examples are described below.

Example 1

Figure 7:
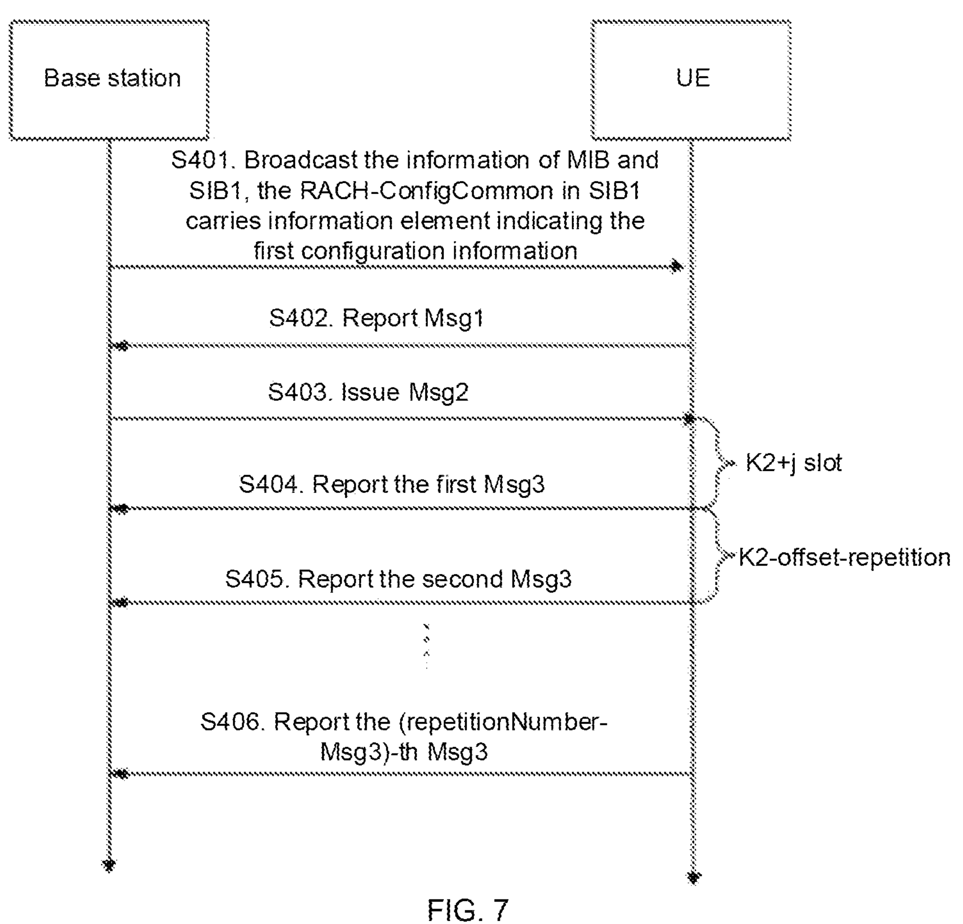
FIG. 7 is a schematic flow chart of Example 1 provided in the embodiments of the present disclosure.

As shown in FIG. 7, FIG. 7 is a schematic flow chart of Example 1. The scenario shown in FIG. 7 is a repeated reporting process of Msg3 under a competition-based access scenario, and the process includes the following steps S401 to S406.

In step S401, the base station broadcasts the information of a master system information block (MIB) and a system information block 1 (SIB1). An information element level of SIB1 from top to bottom includes: SIB, ServingCellConfigCommonSIB, UplinkConfigCommonSIB, BWP-UplinkCommon, and RACH-ConfigCommon. The RACH-ConfigCommon carries an information element indicating the first configuration information, such that the UE may extract the first configuration information from SIB1, where the first configuration information includes K2+j (referring to a time domain starting position of repeated transmissions), K2-offset-repetition (referring to a time domain interval of repeated transmissions), and repetition-Number-Msg3 (referring to a number of repeated transmission signals).

In step S402, the UE reports Msg1 to the base station to initiate a contention-based random access procedure.

In step S403, the base station issues Msg2 to the UE.

In step S404, the UE reports a first Msg3 at a position of K2+j slot from the reception time of Msg2 according to the first configuration information.

In step S405, the UE reports a second Msg3 after an interval of K2-offset-repetition according to the first configuration information.

In step S406, the UE reports a Msg3 at every interval of K2-offset-repetition, until the (repetitionNumber-Msg3)-th Msg3 is reported.

Example 2

Figure 8:
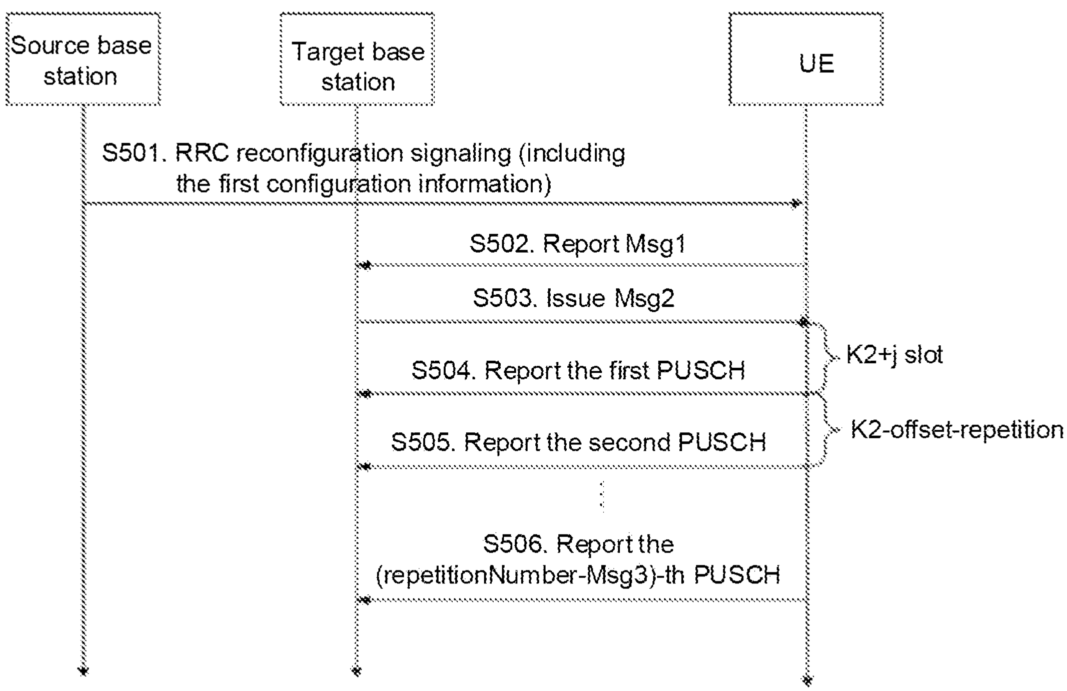
FIG. 8 is a schematic flow chart of Example 2 provided in the embodiments of the present disclosure.

As shown in FIG. 8, FIG. 8 is a schematic flow chart of Example 2. The scenario shown in FIG. 8 is a PUSCH repeated reporting process in a contention-free access scenario, and the process includes the following steps S501 to S506.

In step S501, a source base station issues the first configuration information to the UE through an RRC reconfiguration signaling.

The RRC reconfiguration signaling includes an SCG (Secondary Cell Group) addition signaling of an LTE base station in EN-DC, an SCG addition signaling of an NR base station in NR-DC, a cell switching signaling of the NR base station during cell switching. The information element level of RRC reconfiguration signaling from top to bottom includes: RRCReconfiguration, ServingCellConfigCommon, UplinkConfigCommonSIB, BWP-UplinkCommon, RACH-ConfigCommon. An information element indicating the first configuration information is carried under the level of RACH-ConfigCommon, such that the UE may extract the first configuration information from the reconfiguration signaling. The first configuration information includes K2+j (referring to a time domain starting position of repeated transmissions), K2-offset-repetition (referring to a time domain interval of repeated transmissions), and repetition-Number-Msg3 (referring to a number of repeated transmission signals).

In step S502, the UE reports Msg1 to a target base station to initiate a contention-based random access procedure.

In step S503, the target base station issues Msg2 to the UE.

In step S504, the UE reports a first PUSCH at a position of K2+j slot according to the first configuration information. The PUSCH is scheduled by the RAR UL grant.

In step S505, the UE reports a second PUSCH after an interval of K2-offset-repetition according to the first configuration information.

In step S506, the UE reports a Msg3 at every interval of K2-offset-repetition, until the (repetitionNumber-Msg3)-th Msg3 is reported.

Example 3

Figure 9:
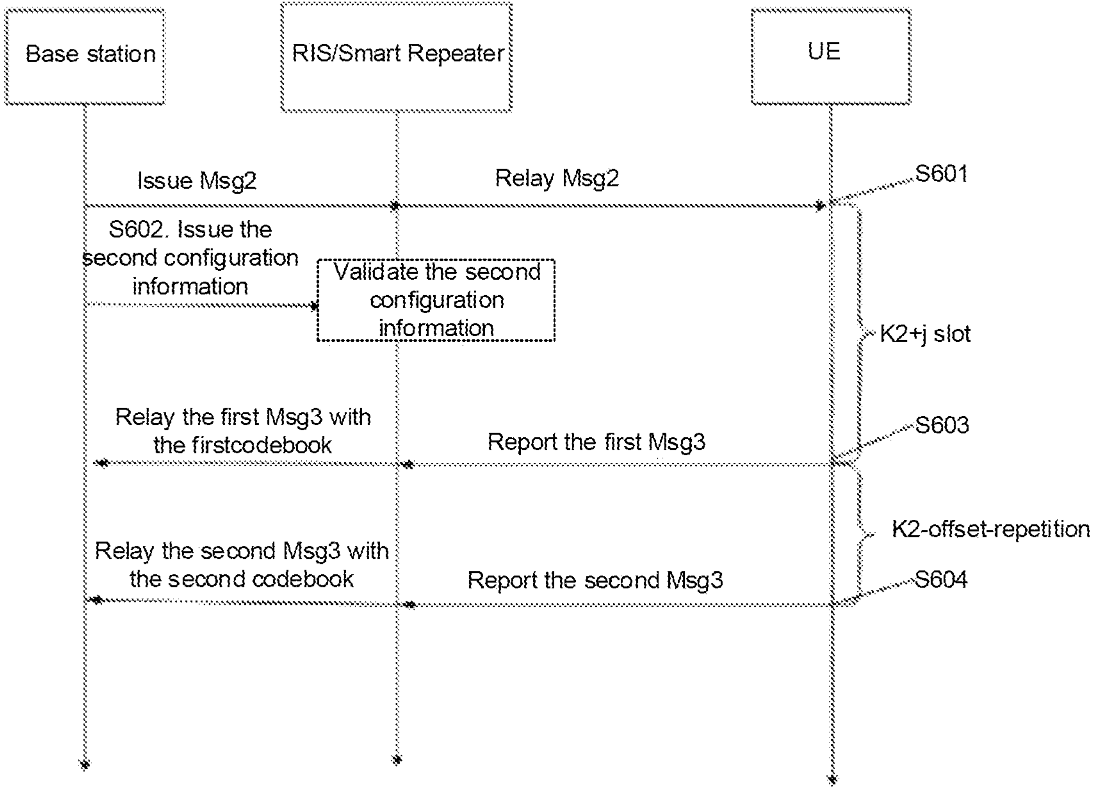
FIG. 9 is a schematic flow chart of Example 3 provided in the embodiments of the present disclosure.

As shown in FIG. 9, FIG. 9 is a schematic flow chart of Example 3. The scenario shown in FIG. 9 is a process for dynamically instructing by the base station the RIS/Smart Repeater to validate the second configuration information, and the process includes the following steps S601 to S604.

In step S601, the base station issues Msg2 (the second message in the random access procedure) to the RIS/Smart Repeater, and then the Msg2 is relayed by the RIS/Smart Repeater to the UE.

In step S602, the base station, while issuing Msg2, transmits the second configuration information carried in a new reference signal, a data packet, etc., to the RIS/Smart Repeater, and then, the RIS/Smart Repeater validates the second configuration information.

In step S603, the UE reports a first Msg3 (the third message in the random access procedure) to the RIS/Smart Repeater, and the RIS/Smart Repeater relays the first Msg3 to the base station with the first codebook.

In step S604, the UE reports a second Msg3 (the third message in the random access procedure) to the RIS/Smart Repeater, and the RIS/Smart Repeater relays the second Msg3 to the base station with the second codebook.

Example 4

Figure 10:
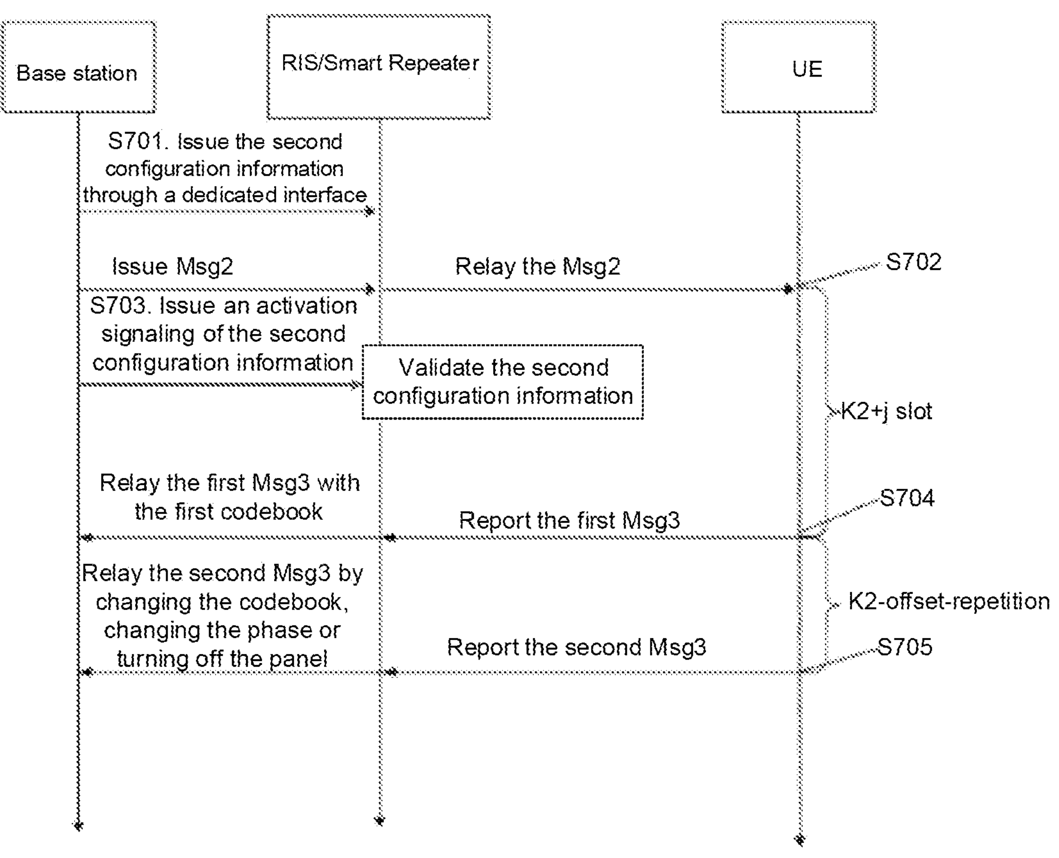
FIG. 10 is a schematic flow chart of Example 4 provided in the embodiments of the present disclosure.

As shown in FIG. 10, FIG. 10 is a schematic flow chart of Example 4. The scenario shown in FIG. 10 is a process for semi-dynamically instructing by the base station the RIS/Smart Repeater to validate the second configuration information, and the process includes the following steps 701 to 705.

In step 701, the base station issues the second configuration information through a dedicated interface with the RIS/Smart Repeater. The second configuration information is specifically, time domain position information (K2+j, K2-offset-repetition and repetitionNumber-Msg3) and relay information of the second configuration signal (changed codebook information, changed phase information or stop-relay indication information) of Msg3 or PUSCH added to the existing communication content.

In step 702, the base station issues Msg2 to the RIS/Smart Repeater, and the RIS/Smart Repeater relays the Msg2 to the UE.

In step 703, the base station, while issuing Msg2, transmits activation signaling of the second configuration information to the RIS/Smart Repeater through a new reference signal, a data packet, etc., so as to trigger the RIS/Smart Repeater to detect the uplink signals of the UE.

In step 704, the UE, after receiving Msg2, reports a first Msg3 at a position of K2+j slot, and a corresponding RIS/Smart Repeater uses the first codebook to relay the first Msg3 at the time of the first Msg3.

In step 705, the UE, after reporting the first Msg3, reports a second Msg3 after an interval of K2-offset-repetition. The corresponding RIS/Smart Repeater relays the second Msg3 by changing the codebook, changing the phase or turning off the panel at the time of the second Msg3.

Example 5

Figure 11:
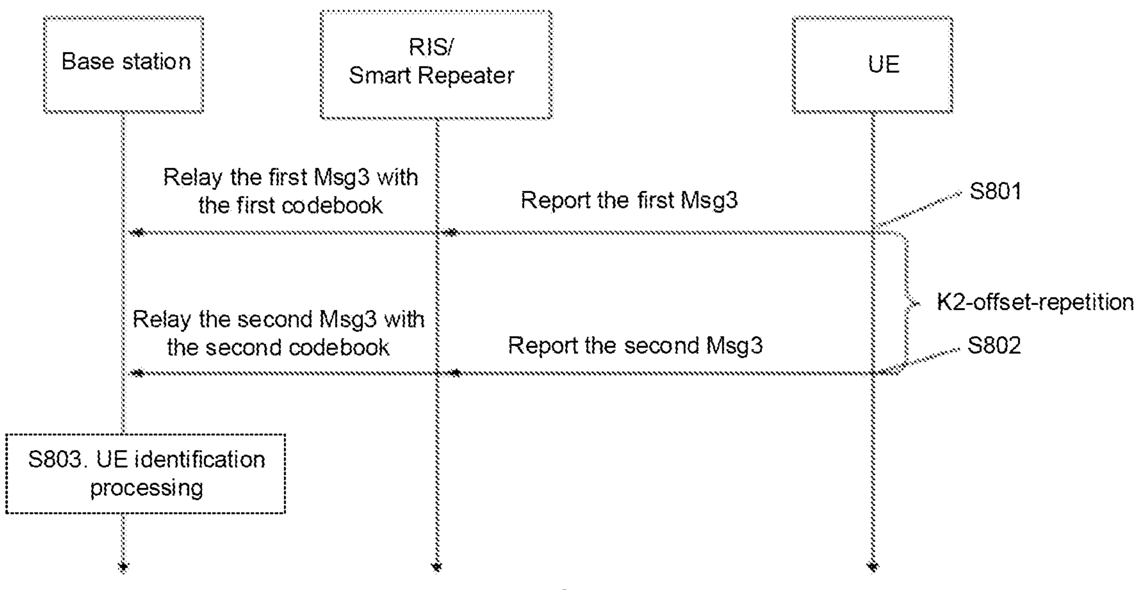
FIG. 11 is a schematic flow chart of Example 5 provided in the embodiments of the present disclosure.

As shown in FIG. 11, FIG. 11 is a schematic flow chart of Example 5. The scenario shown in FIG. 10 is a process for identifying by the base station the UE, and the process includes the following steps S801 to S803.

In step S801, the UE reports a first Msg3, and the RIS/Smart Repeater relays the first Msg3 to the base station with the first codebook.

In step S802, the UE reports a second Msg3, and the RIS/Smart Repeater relays the second Msg3 to the base station with the second codebook.

In step S803, the base station performs UE identification processing, the UE identification processing includes: calculating an RSRP difference and an SINR difference between the first Msg3 and the second Msg3; and determining that the UE is a UE accessed through the RIS/Smart Repeater upon the RSRP gap value being greater than or equal to a preset RSRP difference threshold and the SINR gap value being greater than or equal to a preset SINR difference threshold.

In the solutions of the embodiments of the present disclosure, the network device issues first configuration information to the terminal, where the first configuration information is used to instruct the terminal to transmit a plurality of uplink signals repeatedly after the terminal receives the random access response message, the plurality of uplink signals includes a first uplink signal and a second uplink signal; the network device transmits second configuration information to the signal conditioning apparatus, where the second configuration information is used to instruct the signal conditioning apparatus to relay the first uplink signal and the second uplink signal in different preset modes; and the network device determines the type of the terminal according to a reception situation of the uplink signals in response to receiving the plurality of uplink signals transmitted by the terminal repeatedly. Since the plurality of uplink signals transmitted by the terminal accessed through the signal conditioning apparatus are relayed by the signal conditioning apparatus to the network device in different preset modes, these uplink signals relayed in different preset modes on the network device side have a great difference from each other, and thus, the network device may judge whether these uplink signals from the terminal are transmitted directly by the terminal or relayed by the signal conditioning apparatus according to a difference between the plurality of uplink signals that are received, thereby realizing identification of the type of the terminal during the access phase.

Figure 12:
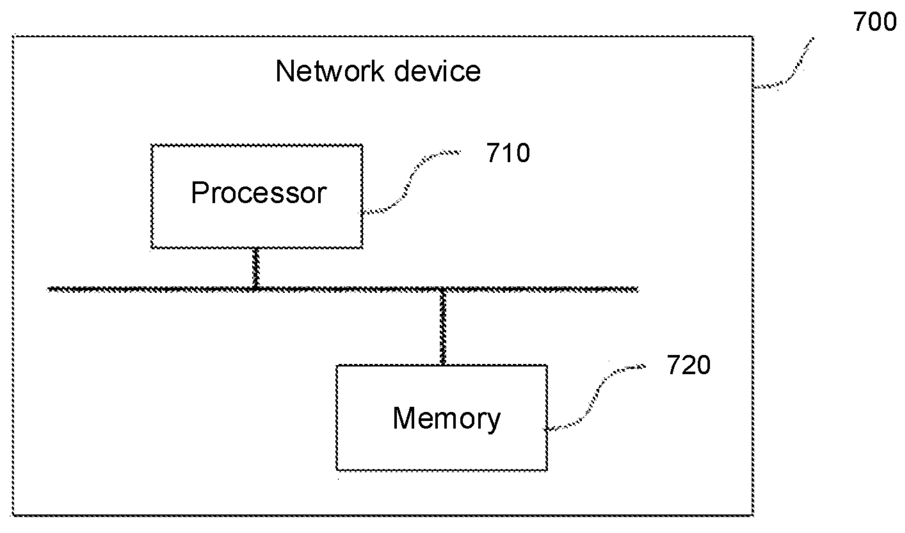
FIG. 12 is a structural schematic diagram of a network device provided in the embodiments of the present disclosure.

The embodiments of the present disclosure further provide a network device. As shown in FIG. 12, the network device 700 includes but is not limited to:

a processor 710 and a memory 720;

the memory 720 has program instructions stored thereon, and the program instructions, upon being executed by the processor 710, cause the processor 710 to perform the method for controlling a random access procedure described in the above embodiments.

The above-mentioned processor 710 and memory 720 may be connected to each other through a bus or in other ways.

It should be understood that the processor 710 may be a central processing unit (CPU). The processor may also be other general-purpose processors, a digital signal processor (DSP), an application specific integrated circuit (ASIC), a field programmable gate array (FPGA) or other programmable logic device, a discrete gate or a transistor logic device, a discrete hardware component, etc. The general-purpose processor may be a microprocessor or any conventional processor, etc. Alternatively, the processor 710 adopts one or more integrated circuits to execute relevant programs to implement the technical solutions provided in the embodiments of the present disclosure.

The memory 720, as a non-transitory computer-readable storage medium, may be used to store a non-transitory software program and a non-transitory computer executable program, such as the method for controlling a random access procedure described in any embodiment of the present disclosure. The processor 710 implements the above-mentioned method for controlling a random access procedure by running a non-transitory software program and instructions stored in the memory 720.

The memory 720 may include a program storage area and a data storage area, where the program storage area may store an operating system and an application program required for at least one function; and the data storage area may store the above-mentioned method for controlling a random access procedure. In addition, the memory 720 may include a high-speed random access memory, and may also include a non-transitory memory, such as at least one magnetic disk storage device, a flash memory device, or other non-transitory solid-state storage devices. In some implementations, the memory 720 optionally includes memories located remotely relative to the processor 710, and these remote memories may be connected to the processor 710 over a network. Examples of the above-mentioned network include but are not limited to the Internet, an intranet, a local area network, a mobile communication network and a combination thereof.

The non-transitory software program and instructions required to implement the above-mentioned method for controlling a random access procedure are stored in the memory 720, and upon being executed by one or more processors 710, are used to perform the method for controlling a random access procedure provided in the embodiments of the present disclosure.

Figure 13:
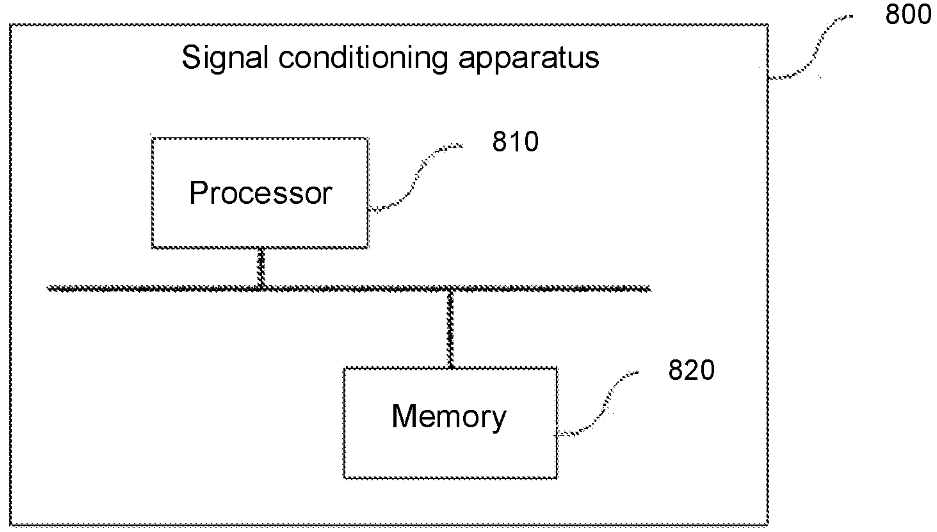
FIG. 13 is a structural schematic diagram of a signal conditioning apparatus provided in the embodiments of the present disclosure.

The embodiments of the present disclosure further provide a signal conditioning apparatus. As shown in FIG. 13, the signal conditioning apparatus 800 includes but is not limited to:

a processor 810 and a memory 820, the memory 820 has program instructions stored thereon, and the program instructions, upon being executed by the processor 810, cause the processor 810 to perform the method for controlling a random access procedure described in the above embodiments.

The above-mentioned processor 810 and memory 820 may be connected to each other through a bus or in other ways.

It should be understood that the processor 810 may be a central processing unit (CPU). The processor may also be other general-purpose processors, a digital signal processor (DSP), an application specific integrated circuit (ASIC), a field programmable gate array (FPGA) or other programmable logic device, a discrete gate or a transistor logic device, a discrete hardware component, etc. The general-purpose processor may be a microprocessor or any conventional processor, etc. Alternatively, the processor 810 adopts one or more integrated circuits to execute relevant programs to implement the technical solutions provided in the embodiments of the present disclosure.

The memory 820, as a non-transitory computer-readable storage medium, may be used to store a non-transitory software program and a non-transitory computer executable program, such as the method for controlling a random access procedure described in any embodiment of the present disclosure. The processor 810 implements the above-mentioned method for controlling a random access procedure by running a non-transitory software program and instructions stored in the memory 820.

The memory 820 may include a program storage area and a data storage area, where the program storage area may store an operating system and an application program required for at least one function; and the data storage area may store the above-mentioned method for control a random access procedure. In addition, the memory 820 may include a high-speed random access memory, and may also include a non-transitory memory, such as at least one magnetic disk storage device, a flash memory device, or other non-transitory solid-state storage devices. In some implementations, the memory 820 optionally includes memories located remotely relative to the processor 810, and these remote memories may be connected to the processor 810 over a network. Examples of the above-mentioned network include but are not limited to the Internet, an intranet, a local area network, a mobile communication network and a combination thereof.

The non-transitory software program and instructions required to implement the above-mentioned method for controlling a random access procedure are stored in the memory 820, and upon being executed by one or more processors 810, are used to perform the method for controlling a random access procedure provided in the embodiments of the present disclosure.

Figure 14:
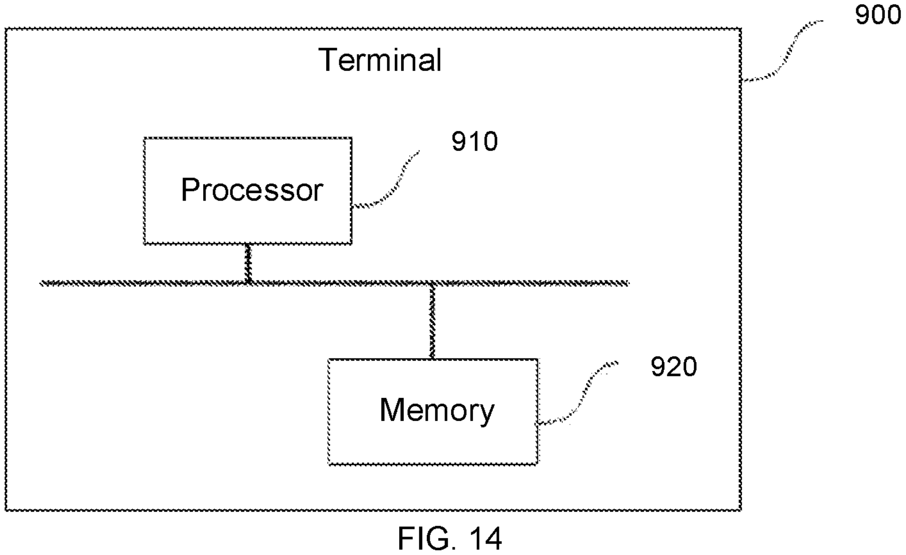
FIG. 14 is a structural schematic diagram of a terminal provided in the embodiments of the present disclosure.

The embodiments of the present disclosure further provide a terminal. As shown in FIG. 14, the terminal 900 includes but is not limited to:

a processor 910 and a memory 920;

the memory 920 has program instructions stored thereon, and the program instructions, upon being executed by the processor 910, cause the processor 910 to perform the method for controlling a random access procedure described in the above embodiments.

The above-mentioned processor 910 and memory 920 may be connected to each other through a bus or in other ways.

It should be understood that the processor 910 may be a central processing unit (CPU). The processor may also be other general-purpose processors, a digital signal processor (DSP), an application specific integrated circuit (ASIC), a field programmable gate array (FPGA) or other programmable logic device, a discrete gate or a transistor logic device, a discrete hardware component, etc. The general-purpose processor may be a microprocessor or any conventional processor, etc. Alternatively, the processor 910 adopts one or more integrated circuits to execute relevant programs to implement the technical solutions provided in the embodiments of the present disclosure.

The memory 920, as a non-transitory computer-readable storage medium, may be used to store a non-transitory software program and a non-transitory computer executable program, such as the method for controlling a random access procedure described in any embodiment of the present disclosure. The processor 910 implements the above-mentioned method for controlling a random access procedure by running non-transitory software program and instructions stored in the memory 920.

The memory 920 may include a program storage area and a data storage area, where the program storage area may store an operating system and an application program required for at least one function; and the data storage area may store the above-mentioned method for control a random access procedure. In addition, the memory 920 may include high-speed random access memory, and may also include a non-transitory memory, such as at least one magnetic disk storage device, a flash memory device, or other non-transitory solid-state storage devices. In some implementations, the memory 920 optionally includes memories located remotely relative to the processor 910, and these remote memories may be connected to the processor 910 over a network. Examples of the above-mentioned network include but are not limited to the Internet, an intranet, a local area network, a mobile communication network and a combination thereof.

The non-transitory software program and instructions required to implement the above-mentioned method for controlling a random access procedure are stored in the memory 920, and upon being executed by one or more processors 910, are used to perform the method for controlling a random access procedure provided in the embodiments of the present disclosure.

The embodiments of the present disclosure further provide a computer-readable storage medium having program instructions stored thereon. The program instructions, upon being executed on a computer, implement the method for controlling a random access procedure described in any of the embodiments of the present disclosure.

The computer storage medium in the embodiments of the present disclosure may be any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, device or means, or any combination thereof. More specific examples (non-exhaustive list) of computer-readable storage media include: an electrical connection having one or more conductors, a portable computer disk, a hard drive, a random access memory (RAM), a read only memory (ROM), an erasable programmable read-only memory (EPROM or flash memory), an optical fiber, a portable compact disk read-only memory (CD-ROM), an optical storage device, a magnetic storage device, or any suitable combination of the above. In this document, a computer-readable storage medium may be any tangible medium that contains or stores a program for use by or in connection with an instruction execution system, apparatus, or device.

A computer-readable signal medium may include data signals propagated in baseband or as part of a carrier wave carrying computer-readable program code therein. Such propagated data signals may take many forms, including but not limited to electromagnetic signals, optical signals, or any suitable combination of the above. A computer-readable signal medium may also be any computer-readable medium other than a computer-readable storage medium that can send, propagate, or transmit a program for use by or in connection with an instruction execution system, apparatus, or device.

Program codes embodied on a computer-readable medium may be transmitted by using any suitable medium, including, but not limited to, wireless, wire, optical cable, RF, etc., or any suitable combination of the above.

Computer program codes for performing operations of the present disclosure may be written in one or more programming languages, including object-oriented programming languages such as Java, Smalltalk, C++, and conventional procedural programming languages or a similar programming language, such as "C", or a combination thereof. The program codes may execute entirely on the user's computer, partly on the user's computer, as a stand-alone software package, partly on the user's computer and partly on a remote computer or entirely on the remote computer or server. In situations involving remote computers, the remote computer may be connected to the user's computer over any kind of network, including a local area network (LAN) or a wide area network (WAN), or may be connected to an external computer (e.g., over the Internet of an Internet service provider).

It should be noted that in the embodiments of the present disclosure, although operations are described in a specific order in the drawings, it should not be understood as requiring that these operations be performed in the specific order shown or in a serial order, or that requiring that all shown operations are performed to obtain the desired results. Under certain circumstances, multitasking and parallel processing may be advantageous.

In addition, in the embodiments of the present disclosure, each embodiment is described with its own emphasis. For a part that is not detailed or recorded in a certain embodiment, please refer to relevant descriptions of other embodiments.

The above is a detailed description of several implementations of the present disclosure, but the present disclosure is not limited to the above implementations. Those skilled in the art can also make various equivalent modifications or substitutions without violating the sharing conditions of the essence of the present disclosure. Equivalent modifications or substitutions are included within the scope defined by the claims of the present disclosure.

What is claimed is:

1. A method for controlling a random access procedure, applied to a network device, wherein the method comprises:

issuing first configuration information to a terminal, wherein the first configuration information is used to instruct the terminal to transmit a plurality of uplink signals repeatedly after the terminal receives a random access response message, and the plurality of uplink signals comprise a first uplink signal and a second uplink signal;

issuing second configuration information to a signal conditioning apparatus, wherein the second configuration information is used to instruct the signal conditioning apparatus to relay the first uplink signal and the second uplink signal in different preset modes; and determining a type of the terminal according to a reception situation of the uplink signals in response to receiving the plurality of uplink signals transmitted by the terminal repeatedly according to the random access response message.

2. The method according to claim 1, wherein the type of the terminal comprises a first type and a second type, the first type characterizes that the terminal accesses the network device directly, and the second type characterizes that the terminal accesses the network device through the signal conditioning apparatus.

3. The method according to claim 2, wherein relaying the first uplink signal and the second uplink signal in the different preset modes comprises the following manners:

relaying the first uplink signal with a first codebook, and relaying the second uplink signal with a second codebook; or, relaying the first uplink signal with the first codebook, and relaying the second uplink signal with a third codebook obtained by changing a phase of the first codebook; or, relaying the first uplink signal with the first codebook, and relaying the second uplink signal with a stop-relay strategy.

4. The method according to claim 3, wherein the determining the type of the terminal according to the reception situation of the uplink signals comprises:

determining the type of the terminal according to signal quality information of the plurality of uplink signals that are received.

5. The method according to claim 4, wherein the determining the type of the terminal according to the signal quality information of the plurality of uplink signals that are received comprises:

acquiring first signal quality information of the first uplink signal among the plurality of uplink signals that are received;

acquiring second signal quality information of the second uplink signal among the plurality of uplink signals that are received; and determining that the type of the terminal is the second type in response to that a difference between the first signal quality information and the second signal quality information is greater than a preset difference threshold.

6. The method according to claim 5, wherein the first signal quality information comprises a first reference signal receiving power (RSRP) and a first signal to interference plus noise ratio (SINR), the second signal quality information comprises a second RSRP and a second SINR, and the preset difference threshold comprises a preset RSRP difference threshold and a preset SINR difference threshold;

the determining that the type of the terminal is the second type in response to that the difference between the first signal quality information and the second signal quality information is greater than the preset difference threshold comprises:

determining that the type of the terminal is the second type, in response to that a difference between the first RSRP and the second RSRP is greater than the preset RSRP difference threshold and a difference between the first SINR and the second SINR is greater than the preset SINR difference threshold.

7. The method according to claim 6, wherein the first uplink signal comprises a plurality of first uplink signals, the second uplink signal comprises a plurality of second uplink signals, the first RSRP is an average value of RSRPs corresponding to the plurality of first uplink signals, the first SINR is an average value of SINRs corresponding to the plurality of first uplink signals, the second RSRP is an average value of RSRPs corresponding to the plurality of second uplink signals, and the second SINR is an average value of SINRs corresponding to the plurality of second uplink signals.

8. The method according to claim 1, wherein the first configuration information comprises at least one piece of the following information: a time domain starting position of repeated transmissions, a time domain interval of repeated transmissions, and a number of repeated transmission signals; or the second configuration information comprises at least one piece of the following information: a time domain starting position of repeated transmissions, a time domain interval of repeated transmissions, a number of repeated transmission signals, changed code information, changed phase information, and stop-relay indication information.

9. The method according to claim 1, wherein the first configuration information is issued to the terminal in any one of the following manners: issuing the first configuration information to the terminal through random access channel (RACH) configuration information, wherein the RACH configuration information comprises an information element carrying the first configuration information; and issuing the first configuration information to the terminal through a random access response message, wherein the first configuration information is carried in the random access response message; or wherein the second configuration information is issued to the signal conditioning apparatus in any one of the following manners: issuing the second configuration information to the signal conditioning apparatus in response to establishing a connection between the network device and the signal conditioning apparatus; and issuing the second configuration information to the signal conditioning apparatus in response to issuing a random access response message.

10. The method according to claim 1, wherein the uplink signals comprise a physical uplink shared channel (PUSCH) or a third message in the random access procedure.

11. The method according to claim 1, wherein the first uplink signal characterizes an i-th uplink signal among the plurality of uplink signals, wherein i is an odd number; and the second uplink signal represents a j-th uplink signal among the plurality of uplink signals, wherein j is an even number.

12. A method for controlling a random access procedure, applied to a signal conditioning apparatus, wherein the method comprises:

acquiring second configuration information issued by a network device in response to receiving a plurality of uplink signals transmitted by the terminal repeatedly according to a random access response message; and relaying the plurality of uplink signals to the network device according to the second configuration information, wherein the plurality of uplink signals comprises a first uplink signal and a second uplink signal, and the first uplink signal and the second uplink signal are relayed in different preset modes, such that the network device determines a type of the terminal according to a reception situation of the uplink signals.

13. The method according to claim 12, further comprising:

receiving the random access response message from the network device, and forwarding the random access response message to the terminal.

14. A method for controlling a random access procedure, applied to a terminal, wherein the method comprises:

acquiring first configuration information issued by a network device in response to receiving a random access response message from the network device;

transmitting a plurality of uplink signals repeatedly to the network device according to the first configuration information, such that the network device determines a type of the terminal based on a reception situation of the uplink signals; or, transmitting a plurality of uplink signals repeatedly to the signal conditioning apparatus according to the first configuration information, wherein the plurality of uplink signals are relayed by the signal conditioning apparatus to the network device, such that the network device determines the type of the terminal according to a reception situation of the uplink signals, the plurality of uplink signals comprises a first uplink signal and a second uplink signal, and the first uplink signal and the second uplink signal are relayed by the signal conditioning apparatus in different preset modes.

15. The method according to claim 14, wherein the first configuration information is acquired in any one of the following manners:

acquiring the first configuration information from random access channel (RACH) configuration information transmitted by the network device, wherein the RACH configuration information comprises an information element carrying the first configuration information; and acquiring the first configuration information from the random access response message, wherein the first configuration information is carried in the random access response message.

16. A network device, comprising:

a processor and a memory; wherein the memory has program instructions stored thereon, and the program instructions, upon being executed by the processor, cause the processor to perform the method according to claim 1.

17. A signal conditioning apparatus, comprising:

a processor and a memory; wherein the memory has program instructions stored thereon, and the program instructions, upon being executed by the processor, cause the processor to perform the method according to claim 12.

18. A terminal, comprising:

a processor and a memory; wherein the memory has program instructions stored thereon, and the program instructions, upon being executed by the processor, cause the processor to perform the method according to claim 14.

19. A non-transitory computer-readable storage medium having program instructions stored thereon, wherein the program instructions, upon being executed on a computer, implement the method according to claim 1.

20. A non-transitory computer-readable storage medium having program instructions stored thereon, wherein the program instructions, upon being executed on a computer, implement the method according to claim 12.

* * * * *